United States Patent

Arends

[11] Patent Number: 6,135,756
[45] Date of Patent: Oct. 24, 2000

[54] DIFFERENTIAL PRESSURE FORMING, TRIMMING AND STACKING APPARATUS

[76] Inventor: Albert W. Arends, 3017 N. South Dr., Gladwin, Mich. 48624

[21] Appl. No.: 08/876,041

[22] Filed: Jun. 13, 1997

[51] Int. Cl.[7] ............................. B29C 51/22; B29C 51/44
[52] U.S. Cl. ........................ 425/398; 425/292; 425/388; 425/403.1; 425/442; 425/443; 425/444
[58] Field of Search ................................ 425/292, 403.1, 425/441, 442, 443, 444, 388, 398

[56] References Cited

U.S. PATENT DOCUMENTS

| | | |
|---|---|---|
| 3,496,257 | 2/1970 | Brown et al. . |
| 3,585,689 | 6/1971 | Brown et al. . |
| 3,664,791 | 5/1972 | Brown ................................. 425/156 |
| 3,792,955 | 2/1974 | Vermeulen ........................... 425/443 |
| 4,132,319 | 1/1979 | Padovani ........................... 425/403.1 |
| 4,170,621 | 10/1979 | Kiefer .................................. 264/322 |
| 4,313,358 | 2/1982 | Brown ..................................... 83/97 |
| 4,354,819 | 10/1982 | Wirz .................................... 425/443 |
| 4,560,339 | 12/1985 | Padovani ............................. 425/437 |
| 4,565,513 | 1/1986 | Kiefer .................................. 425/289 |
| 5,044,919 | 9/1991 | Hama et al. ......................... 425/443 |
| 5,225,213 | 7/1993 | Brown et al. ....................... 425/292 |
| 5,453,237 | 9/1995 | Padovani ........................... 425/403.1 |

FOREIGN PATENT DOCUMENTS 1276900  12/1968  Germany .

*Primary Examiner*—Kuang Y. Lin
*Assistant Examiner*—Joseph Leyson

[57] ABSTRACT

Apparatus for forming articles in a thermoplastic sheet, severing the articles in the sheet, and stacking the articles in a stacking receiver. The apparatus includes upper and lower molds moveable between closed positions in which the molds engage opposite sides of the sheet to differentially pressure form a part in the thermoplastic sheet. The molds in which the article is formed are moved toward each from the closed positions to article trim positions to sever the article from the sheet. The lower mold is then moved linearly away from the sheet in a vertical direction and then transversely moved in a second linear transverse path of travel to a remote discharge location. Apparatus is provided for reorienting the mold between its orientation in the first linear path of travel and its orientation in the second path of travel.

70 Claims, 24 Drawing Sheets

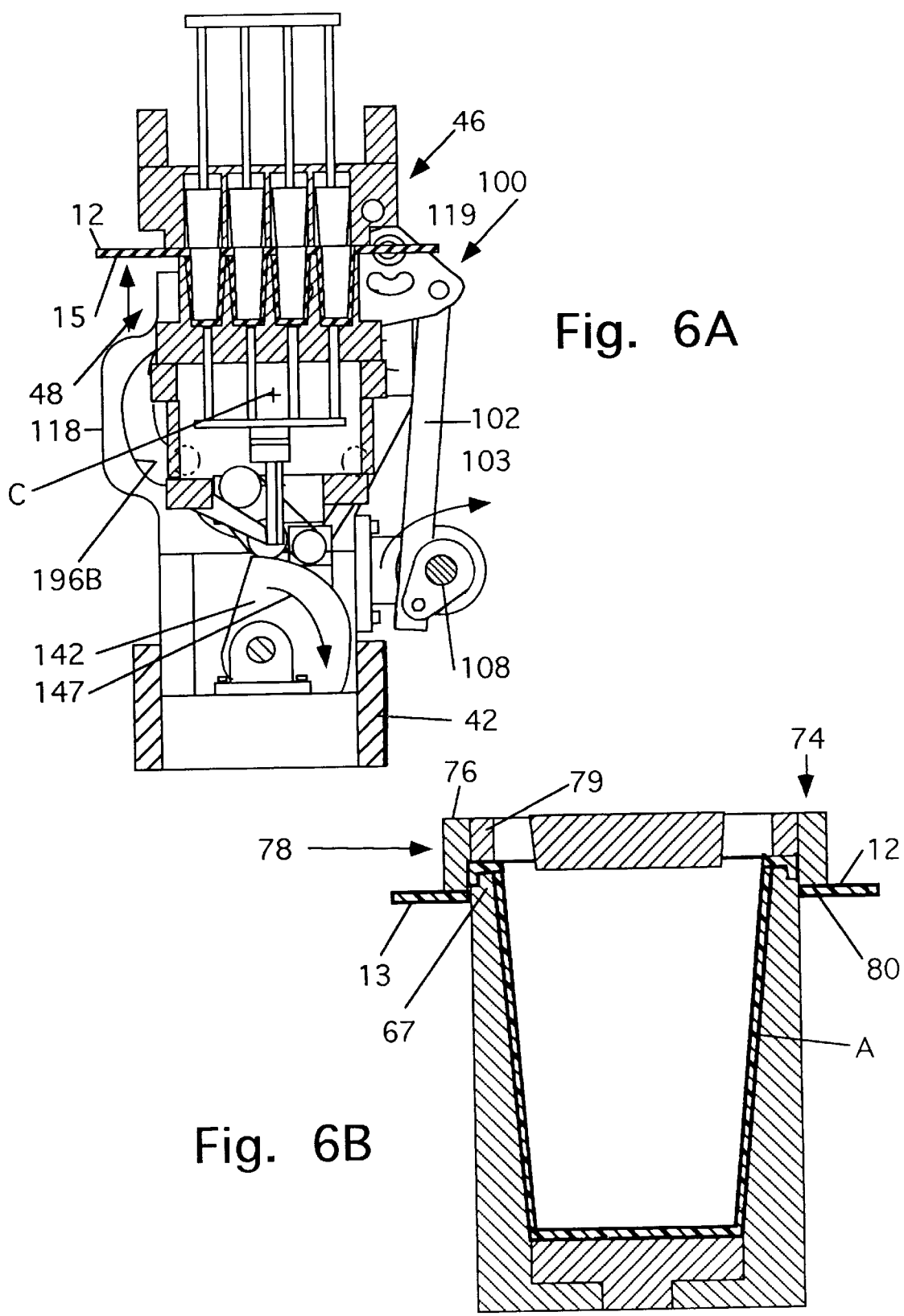

DIFFERENTIAL PRESSURE FORMING, TRIMMING AND STACKING APPARATUS

BACKGROUND OF THE INVENTION

1. Field of the Invention

This invention relates to differential pressure forming apparatus and more particularly to transfer apparatus for transferring an article differentially pressure formed in, and trimmed from, a thermoplastic sheet at a form and trim station to a vertically lowered and horizontally displaced discharge station.

2. Description of the Prior Art and Objects

Apparatus, such as that disclosed in U.S. Pat. No. 5,585,689 issued to G. W. Brown, et al on Jun. 22, 1971, and U.S. Pat. No. 4,313,358 issued to Gaylord W. Brown on Feb. 2, 1982, which are each incorporated herein by reference, has been provided heretofore for trimming articles, differentially pressure formed in a thermoplastic sheet, at a trimming station which is downstream of a forming station. U.S. Pat. No. 5,225,213 issued to G. W. Brown and Albert W. Arends on Jul. 6, 1993, discloses apparatus for trimming an article from a thermoplastic sheet including a wedge for incrementally moving a trim die from a remote position to a sheet severing position.

A problem attendant to the machines which trim parts in a thermoplastic sheet is the removal of parts from the mold. One machine which has been provided for removing differential pressure formed parts from the mold includes a vacuum plate, of the type illustrated in U.S. Pat. No. 4,560,339 issued on Dec. 24, 1985 to Pietro Padovanni. This patent discloses the concept of moving a vacuum plate between separated molds, engaging the cups and withdrawing them from the molds. This is a relatively slow, time consuming process.

A problem with this prior art construction which differential pressure forms at an upstream forming station and trims the part from the sheet at a downstream trimming station is the complications resulting from the inability to consistently control the batch to batch chemistry of the plastic. When the articles are transferred to the downstream trim station, the parts may not be precisely aligned with the trim mold to precisely allow accurate trimming. Accordingly, it is advantageous to trim the article "in place" in the mold in order to trim concentrically with the lip of the article being formed.

U.S. Pat. No. 4,170,621, issued to Gunther Keifer on Oct. 9, 1979, discloses forming apparatus having an "in place" trimming machine driven by a cam for trimming parts from a sheet at the mold station. The cutting force required to sever the sheet is rather large and the force exerted by a cam, as disclosed in Kiefer, is sometimes insufficient to properly sever the sheet.

U.S. Pat. No. 4,565,513 issued to Gunther Kiefer on Jan. 21, 1986 discloses apparatus for forming and trimming a part in a thermoplastic sheet at a form and trim station, lowering the lower mold in which a part is formed, tilting the lower platen and mold thereon from a vertical position to a horizontally disposed position, and then ejecting a part into a stacking machine. There are several problems attendant to this construction illustrated in this latter patent including the inability to efficiently and accurately transfer the formed and severed parts to a stacker. Accordingly, it is an object of the present invention to provide new and novel method and apparatus for efficiently and accurately transferring articles, which have been differentially pressure formed in a female mold and trimmed from a thermoplastic sheet while still in the mold from the female mold to a stacker.

Another device for transferring formed parts from a mold at a mold and trim station to a stacker receiver is illustrated in German Publication 1276900 dated Sep. 5, 1968. The construction illustrated in this German publication also is of limited value, however, in that the apparatus only rotates the lower platen and mold thereon and does not bodily move the lower mold horizontally toward the stacker after it is rotated to its lowermost position. It is difficult to transfer the articles in the mold from the mold to the receiver. In this prior construction, there will be a gap between the mold in the rotated position and the receiver stacker. Consequently, due to the great distance through which the article must be propelled to reach the stacker tremendously large ejection force is required to physically propel the articles from the mold through the gap to the stacker. Accordingly, it is an object of the present invention to provide apparatus of the type described which will reduce the ejection forces required to transfer the articles from a differential pressure forming mold to a stacker at a lowered, horizontally disposed stacking station.

It is another object of the present invention to provide transfer apparatus of the type described which will linearly move the mold in a horizontal direction after the mold has moved vertically and after the mold, and article formed therein have been reoriented.

It is yet another object of the present invention to provide new and novel method and apparatus for transferring formed and trimmed articles from a mold and trim station to a stacker and which will move articles vertically away from the mold and trim station and thence will rotate the articles to reorient them to a new orientation, and then move the reoriented parts horizontally to a discharge position disposed in nesting relation with other previously discharged articles.

Another object of the present invention is to provide apparatus which will overcome the problems with the prior art.

It is still another object of the present invention to provide apparatus for transferring formed and trimmed parts having a vertical orientation at a form and trim station to a horizontally disposed orientation at a lower, horizontally displaced discharge station including mechanism for bodily moving the mold and articles thereon in a horizontal direction after the articles have been vertically retracted from the mold and trim station to a lowermost position.

The rotating movement of prior art machines illustrated in the aforementioned prior art U.S. Pat. No. 4,565,513 and the German publication 1276900 imparts a compound motion to the lower mold and trim die. Substantial energy is dissipated to stop the compound motion of the prior art mold and trim die at the stacking station. Accordingly, it is an object of the present invention to provide new and novel apparatus of the type described for efficiently transferring articles, which have been differential pressure formed in and trimmed in place from a thermoplastic sheet, to a vertically and horizontally displaced discharge station.

One of the other problems with the prior art constructions is that the articles, which typically include hollow, then walled plates, cups, and the like are held in the stacker by circumferentially disposed brushes which are intended to grip the circumferential edge but don't always hold the hollow articles in proper alignment to be stacked with successively discharged articles. When the previously ejected hollow article is not properly aligned in the stacker, the hollow article which is being ejected from the mold or platen, can catch on the previously manufactured cups and both articles can be crushed. With apparatus constructed according to the present invention, the articles, while still in the mold, will be moved into nested relation with the last previously discharged article in the stacker. Accordingly, it is another object of the present invention to provide apparatus of the type described which will minimize the article destruction during the transfer cycle from a differential pressure forming mold to a stack of articles at a stacking station.

It is another object of the present invention to provide apparatus of the type described which will increase the accuracy of alignment of the successively discharged articles at a stacking station.

It is a further object of the present invention to provide mold and trim die apparatus of the type described which will vertically move from a form and trim station to a lowered reoriented position and thence horizontally to move a part into stacking relation with other parts previously discharged to a stacker.

It is another object of the present invention to provide new and novel apparatus for transferring formed and trimmed parts which will enhance the stacking and minimize the part failure.

Another object of the present invention is to provide apparatus of the type described which will move a mold carrying an article, which has been differentially pressure formed therein, to a remote discharge position to be telescopingly received by a previously discharged part in a stacker so that the part is discharged into nesting relation with the previously discharged part.

With the prior art structures, the mold is rotated and brought to a stop before the eject cycle starts. This delay in ejection increases the production time and is relatively inefficient. Accordingly, it is an object of the present invention to provide new, novel, and efficient apparatus which will commence the eject cycle while the mold is being linearly moved relative to a discharge position adjacent the stacker.

During the eject portion of the transfer cycle, the bottom wall of the mold in the aforementioned U.S. Pat. No. 4,565,513 is essentially moved the full length of the mold to completely eject the part from the mold prior to reversing the rotation of the mold. To attain the high ejection velocity required to eject articles from in the prior art illustrated in the U.S. Pat. No. 4,565,513, the bottom mold wall must be moved substantially the entire length of the mold cavity at the stacking station. The extension of the prior art ejector does not commence until after the mold is fully rotated. The retraction of the prior art mold to the forming station does not commence until the bottom wall is retracted which takes substantial time and delays the overall production time. It has been found, according to the present invention, the parts can be ejected while the mold is moving to its final discharge position.

Accordingly, it is another object of the present invention to provide transfer apparatus of the type described which will increase the speed and efficiency of operation by ejecting the parts while the mold is being moved horizontally relative to the stacker.

It is another object of the present invention to provide apparatus of the type described which will discharge a hollow article, having a closed end and an open end, by partially nesting the hollow article being discharged with a previously ejected hollow articles at a stacking station before the hollow article is ejected from the mold.

It is a further object of the present invention to minimize the ejection time inherent in the prior art constructions.

It is another object of the present invention to provide apparatus of the type described which will include a bottom wall of a mold that serves as an article ejector and which will commence movement as the mold is being horizontally moved relative to a stacking station and while being discharged to minimize the distance through which the ejector moves relative to the mold to eject the part.

It is another object of the present invention to provide apparatus of the type described which accelerates and decelerates with cycloidal motion as opposed to very sharp acceleration and deceleration of the prior art.

In the apparatus disclosed in the aforementioned U.S. Pat. No. 4,565,513, the force of gravity, tending to move the mold downwardly, must also be overcome in order to stop rotation of the machine at the discharge station. It has been discovered that it is advantageous to utilize the force of gravity to advantage by converting the linear downward motion of the mold and trim die to rotary motion of the mold and trim die and thus, absorb the rotary energy and reduce the force otherwise required to stop the machine. Accordingly, it is another object of the present invention to provide apparatus of the type described which will convert linear motion energy to rotary motion energy and vice versa to reduce the total energy otherwise required to transfer articles between the mold station and the discharge station.

The path of movement of the mold in the German Publication 1276900 is only arcuate and is not linear at either end. More energy is required to rotate mass and to move it vertically through the same distance. It has been found, according to the present invention, that energy can be conserved by moving the mold linearly to build up linear energy and then transferring or converting the linear energy into rotary energy to at least partially reorient the article being formed to its proper disposition for ejection and then converting the rotary energy to linear energy for linearly transferring the mold transversely in another path to a stacker. Accordingly, it is an object of the present invention to provide apparatus for moving a mold carrying an article part which has been differentially pressure formed therein in a first linear path and then in a transverse linear path and rotating the mold to reorient the mold to different orientations between the paths.

It is a further object of the present invention to provide apparatus of the type described which will move a mold carrying a part in a vertical linear path, horizontally move the mold in a second linear path transverse to the vertical linear path, and reorienting the part as it moves in the first and second paths of travel.

It is a further object of the present invention to provide apparatus of the type described which will linearly withdraw a differential pressure mold and trim die in a first linear, withdrawal path and move the part relative to the mold and trim die as the mold and trim die is moving in a separate linear path transverse to the first linear withdrawal path.

Other objects and advantages of the present invention will become apparent to those of ordinary skill in the art as the description thereof proceeds.

SUMMARY OF THE INVENTION

Apparatus for forming, trimming and stacking articles including: a differential pressure mold and trim die for differentially pressure forming an article, having a predetermined orientation, in a thermoplastic sheet and trimming the article from the sheet at a mold and trim station; mechanism for moving the mold and trim die in a first linear path of travel in a direction away from the thermoplastic sheet to a remote position; mechanism for displacing the mold and trim die in a second linear path of travel transverse to the first linear path of travel from the remote position to a transversely disposed discharged position; mechanism for rotating the mold and trim die to reorient the article from a first predetermined orientation in the first path of travel to a second orientation transversely offset relative to the predetermined orientation in the second path of travel, and mechanism for ejecting the article in the second orientation from the mold and trim die at the transversely disposed discharged position.

DESCRIPTION OF THE DRAWINGS

The invention may be more readily understood by referring to the accompanying drawings, in which:

FIG. 6A is a sectional side view, similar to FIG. 5A, illustrating the mold and trim die assembly in an adjusted trim position when the camming mechanism is in the position illustrated in FIG. 6;

FIG. 6B is a greatly enlarged sectional side view illustrating only one of the mold cavities in the trim position illustrated in FIG. 6A.

DESCRIPTION OF PREFERRED EMBODIMENT

Figure 1:
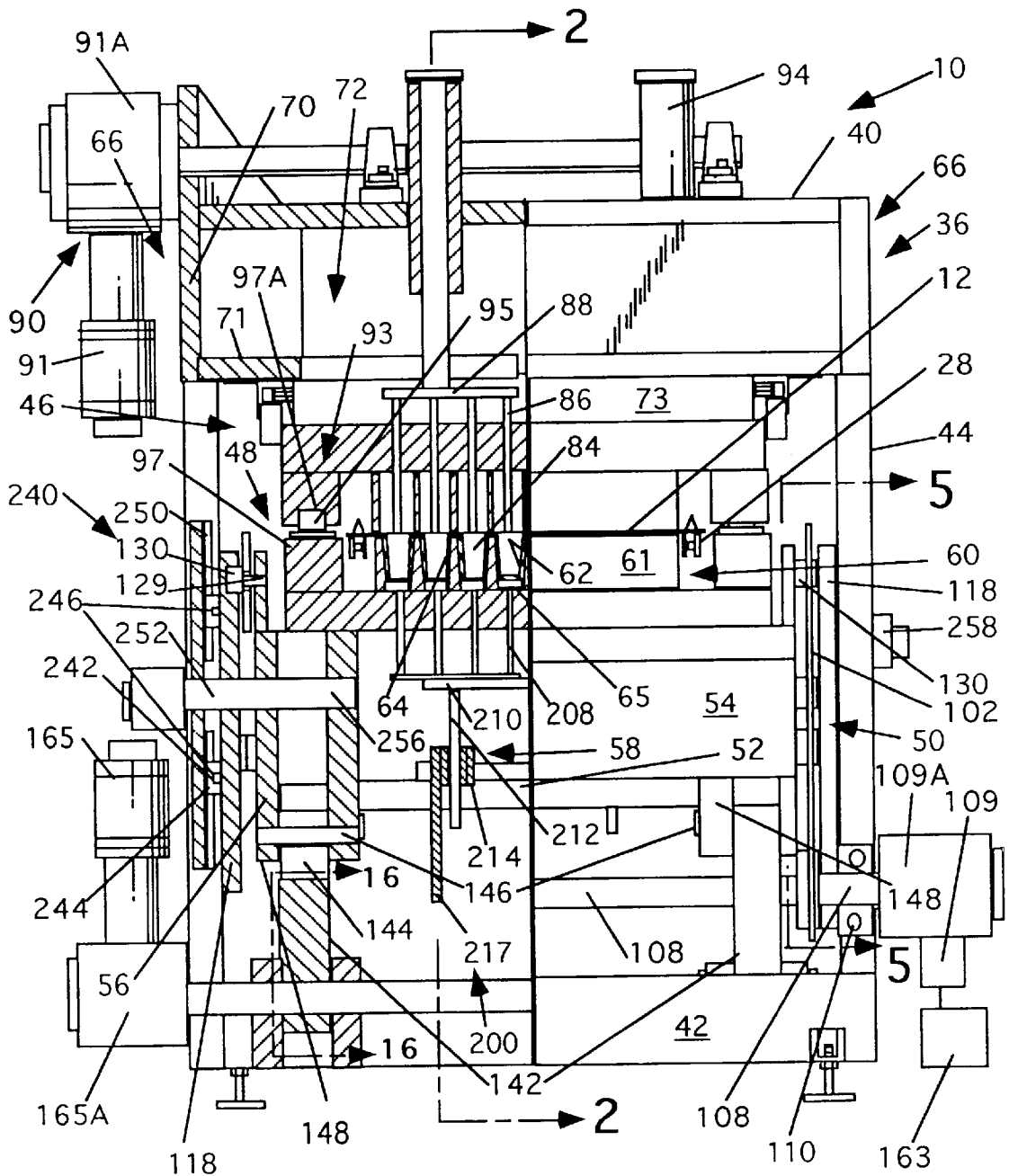
FIG. 1 is partial front elevational end view and partial front sectional end view, taken along the section line 1—1 of FIG. 2, of forming, trimming and stacking apparatus constructed according to the present invention with the molds being illustrated in the closed, part forming positions.

Apparatus constructed according to the present invention, generally designated 10, is provided for differentially pressure forming an article A (FIG. 6B) in a thermoplastic sheet 12 of thermoplastic material at a mold and trim station 14, trimming the article A from the sheet 12 at the mold and trim station 14, and transferring the severed article A from the mold and trim station 14 to a stacker 16 at a discharge station 18.

The differential pressure forming, trimming and stacking apparatus 10 includes a frame, generally designated 20, sheet supply mechanism, generally designated 22, and a tunnel oven, generally designated 30. The frame 20 includes horizontal, vertically spaced apart, side rails 24 spanned by vertical rails 26 which mount laterally spaced apart chains 28, driven by frame mounted motor 29 for carrying a continuous sheet 12 of thermoplastic material in a downstream path of travel, represented by the arrow 32, to the tunnel oven 30 and thence to the mold and trim station 14. The side rails 24 are also supported as they pass through the mold and trim station 14 by laterally outwardly extending, frame supported bars. The sheet supply mechanism 22 and the oven 30 are conventional and are more particularly disclosed in U.S. Pat. No. 3,585,689 issued to G. W. Brown, et al on Jun. 22, 1971, which is incorporated herein by reference.

The apparatus 10 includes a mold and trim die assembly, generally designated 34 having a sub-frame, generally designated 36, provided with upper and lower laterally extending frame bars 40 and 42, respectively, spanned by spaced apart vertical frame bars 44.

The mold and trim die assembly 34 includes upper and lower mold and trim dies 46 and 48, respectively. The mold and trim die assembly 34 is of conventional construction and is more particularly identified in aforementioned U.S. Patents which are incorporated herein by reference. Generally, however, the lower mold and trim die 48 includes a lower platen, generally designated 50, having laterally extending rails 52 mounting a pair of spaced apart end walls 54 spanned by laterally spaced apart side walls 56 which cooperate to define a hollow cavity 58.

Mounted atop the upper end 53 of lower platen 50 is a lower female mold, generally designated 60, having a mold box, generally designated 61, provided with a plurality of mold cavities 62 therein illustrated as having inverted truncated cone shaped side walls 64 and independent bottom walls 65 for receiving the sheet 12 as differential pressure is applied to opposite sides of the sheet 12 in the mold cavities 62 in a conventional manner. The lower mold 60 will form the articles A integral with the sheet 12 in a conventional manner when the lower mold 60 is in the raised forming position, at the mold and trim station 14, illustrated in FIGS. 2, 5A and 5B, engaging the underside 15 of the thermoplastic sheet 12.

The apparatus for applying the differential pressure to the sheet 12 is conventional in nature and will not be repeated in detail herein, however, reference may be had to the aforementioned U.S. Pat. No. 3,664,791 issued to G. W. Brown on May 23, 1971; U.S. Pat. No. 3,346,923 issued to G. W. Brown, et al, on Oct. 17, 1967, U.S. Pat. No. 3,496,257 issued to G. W. Brown on Feb. 17, 1990 and U.S. Pat. No. 5,225,213 issued to Gaylord W. Brown and Albert W. Arends on Jul. 6, 1993, all of which are incorporated herein by reference for a more particular description thereof. Vacuum forces are applied to the portion of the sheet 12 in the hollow mold cavities 62 to draw the sheet 12 into the cavities 62 to form the articles A integrally with the sheet in a conventional manner.

Figure 5:
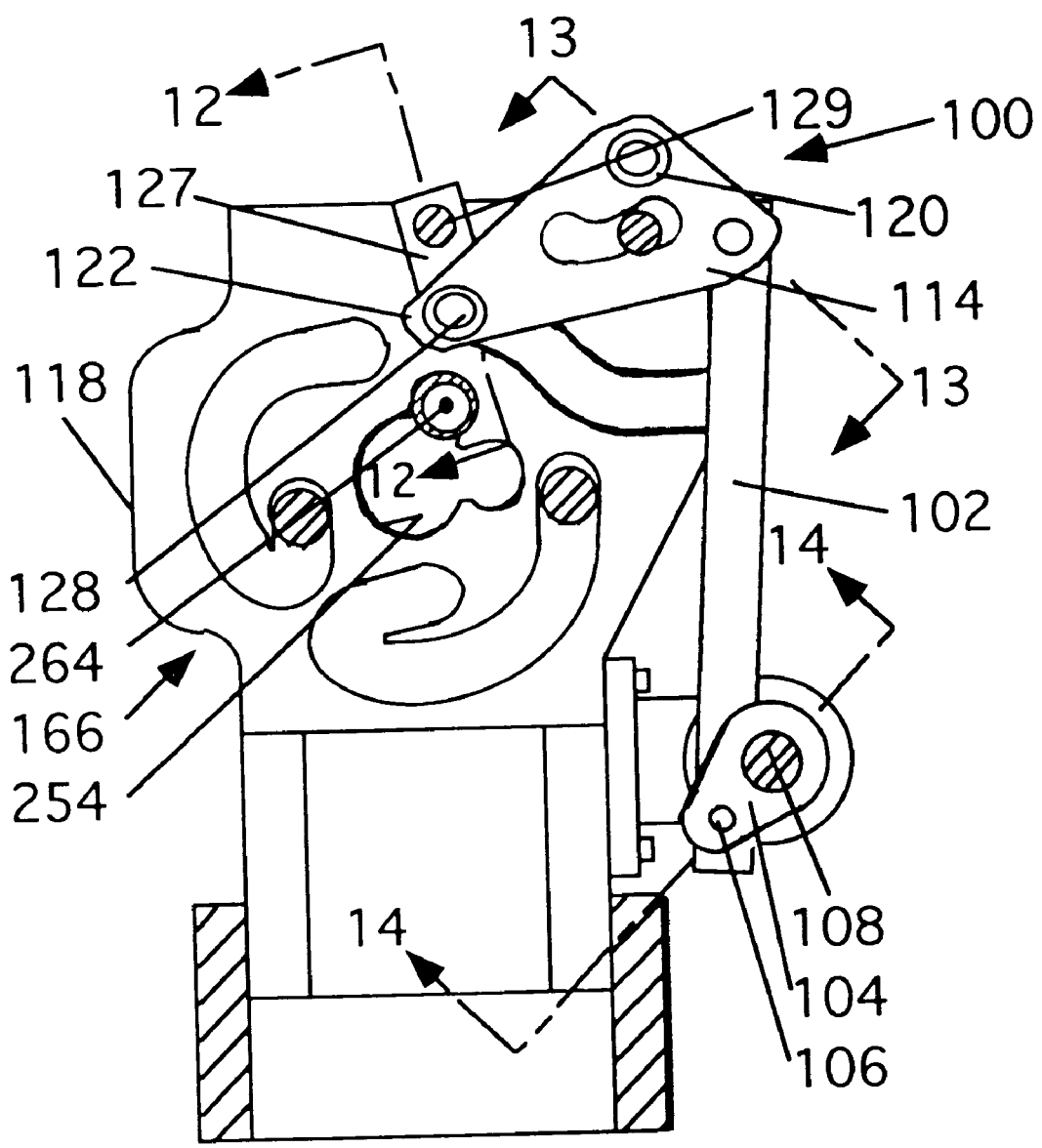
FIG. 5 is an enlarged sectional side view of the cam mechanism for rotating the lower platen, taken along the section line 5—5 of FIG. 1.
Figure 5A:
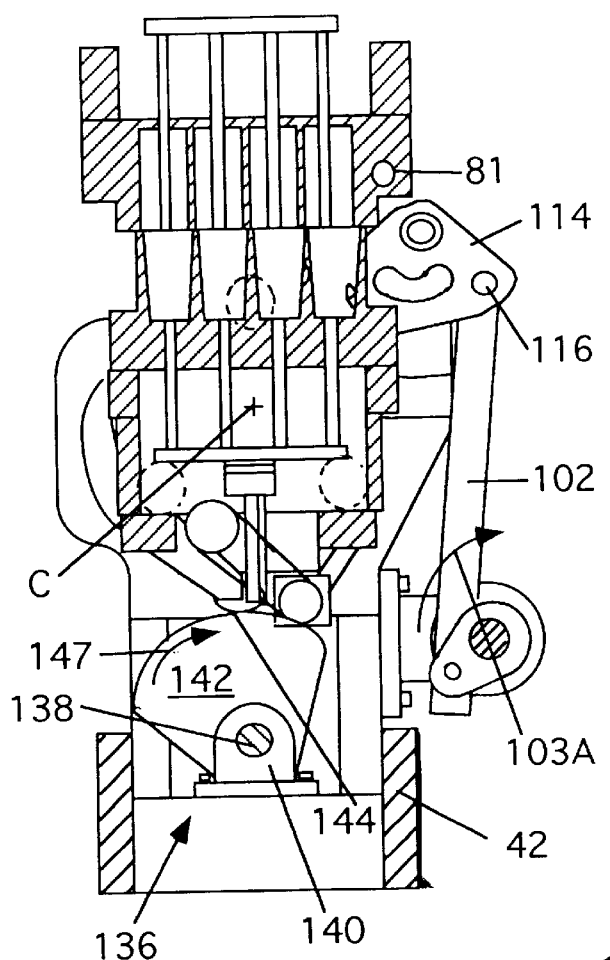
FIG. 5A is a fragmentary sectional side view, similar to FIG. 2, illustrating the position of the mold and trim die assembly in the final form or mold positions when the platen rotating cam mechanism is in the position illustrated in FIG. 5.
Figure 5B:
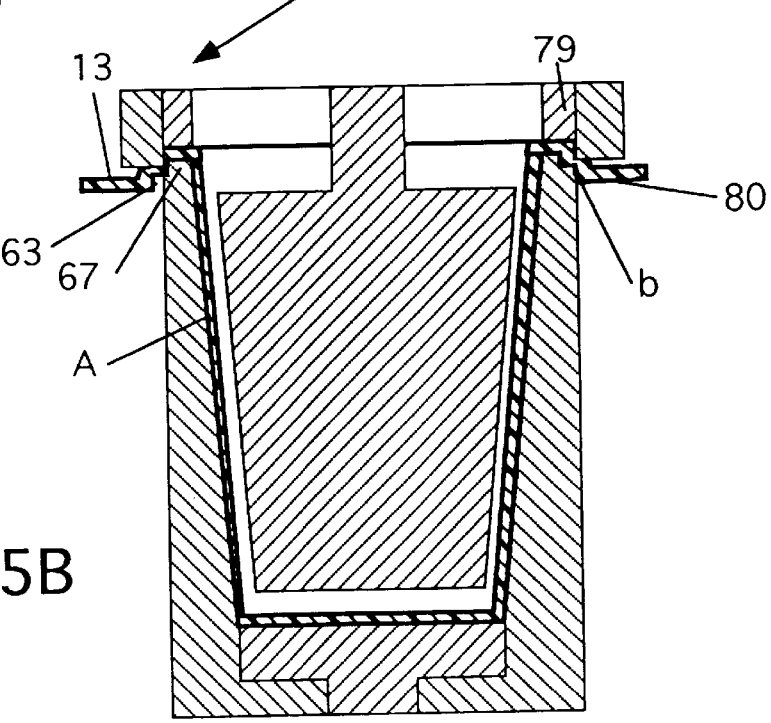
FIG. 5B is a greatly enlarged front sectional view of only one of the mold cavities, in the final form position illustrated in FIG. 5A.

The upper end 67 of the lower mold box 61 engages the underside 15 of the sheet 12 and includes an outer, annular cutout or reduced height step 63 which receives a portion of the sheet 12 during the forming portion of the cycle (FIGS. 5A and 5B). The step 63 includes an annular knife edge 63A for engaging the underside 15 of sheet 12 along the border b of an article A in the sheet 12.

The upper mold and trim die 46 includes an upper platen 66 (FIG. 2) having longitudinally spaced apart frame bars 68 spanned by side bars 70 and bottom frame bar 71 forming, with top bar 40, a hollow cavity 72. The underside of the upper platen bar 71 mounts an upper mold or tool, generally designated 74, having a pair of laterally extending longitudinally spaced tool mounting bars 73 which mount a hollow, box like frame 76, having lower sheet engaging portions, generally designated 78, (FIGS. 4B, 5B and 6B) which engage the upper side 13 of the sheet 12 and are complemental to the upper end portion 67 of the lower mold box 61.

The upper platen 66 mounts a plurality of plug assists 84 of conventional construction which are mounted on vertical rods 86 coupled to a plate 88. The rods 86 are vertically, reciprocally received in apertures 90 provided in the frame 76 for movement between from retracted, raised positions received in the box frame 76, as illustrated in FIG. 2A, and extended molding positions illustrated in FIG. 2 and 5A.

Mechanism, generally designated 90, is provided for vertically moving the plug assists 84 between the retracted positions and the molding positions via a pair of upstanding racks 92 fixed to the rod mounting plate 88 and vertically received by a pair of sleeves 94 mounted on the header 40. Each rack 92 is vertically driven via a pinion gear 96 mounted on a shaft 98 journaled on the frame header 40. The shaft 98 is driven via a servomotor and gear box 91 and 91A, respectively. In the extended positions, illustrated in FIG. 5A, the plug assists 84 will assist the movement of the sheet 12 into the mold cavity 62, as usual.

The lower sheet engaging portion 78 of the upper mold 74 includes a plurality of annular knife edges 80 which bear against the upper sheet surface 13 and slidingly receive the lower knife edges 63A when the upper and lower molds 74 and 60 are in the forming and trimming positions illustrated in FIGS. 5B and 6B, respectively.

Figure 4:
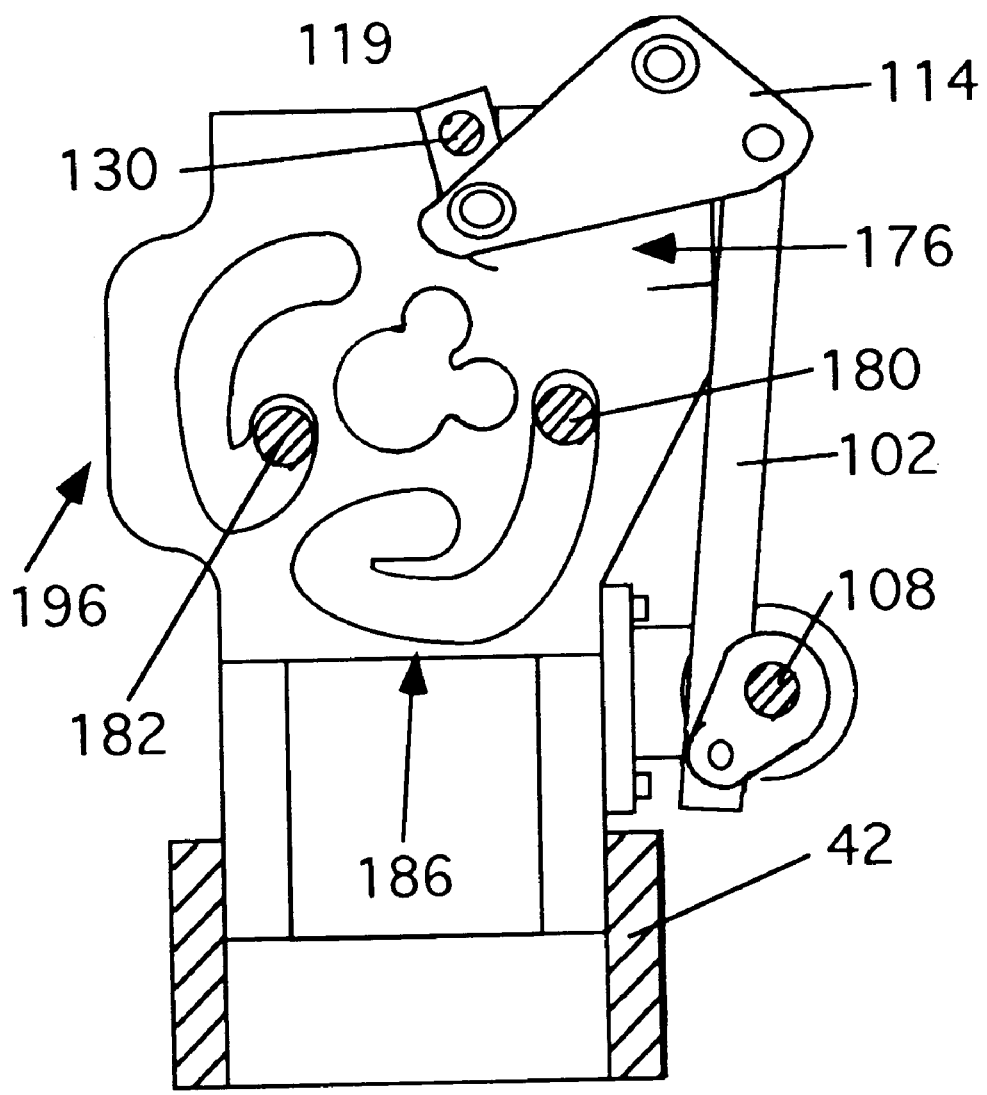
FIG. 4 is a fragmentary sectional side view of the cam mechanism for rotating the lower platen, in the position it assumes when the mold and trim die assembly is in the preliminary forming position illustrated in FIG. 4A.
Figures 4A, 4B:
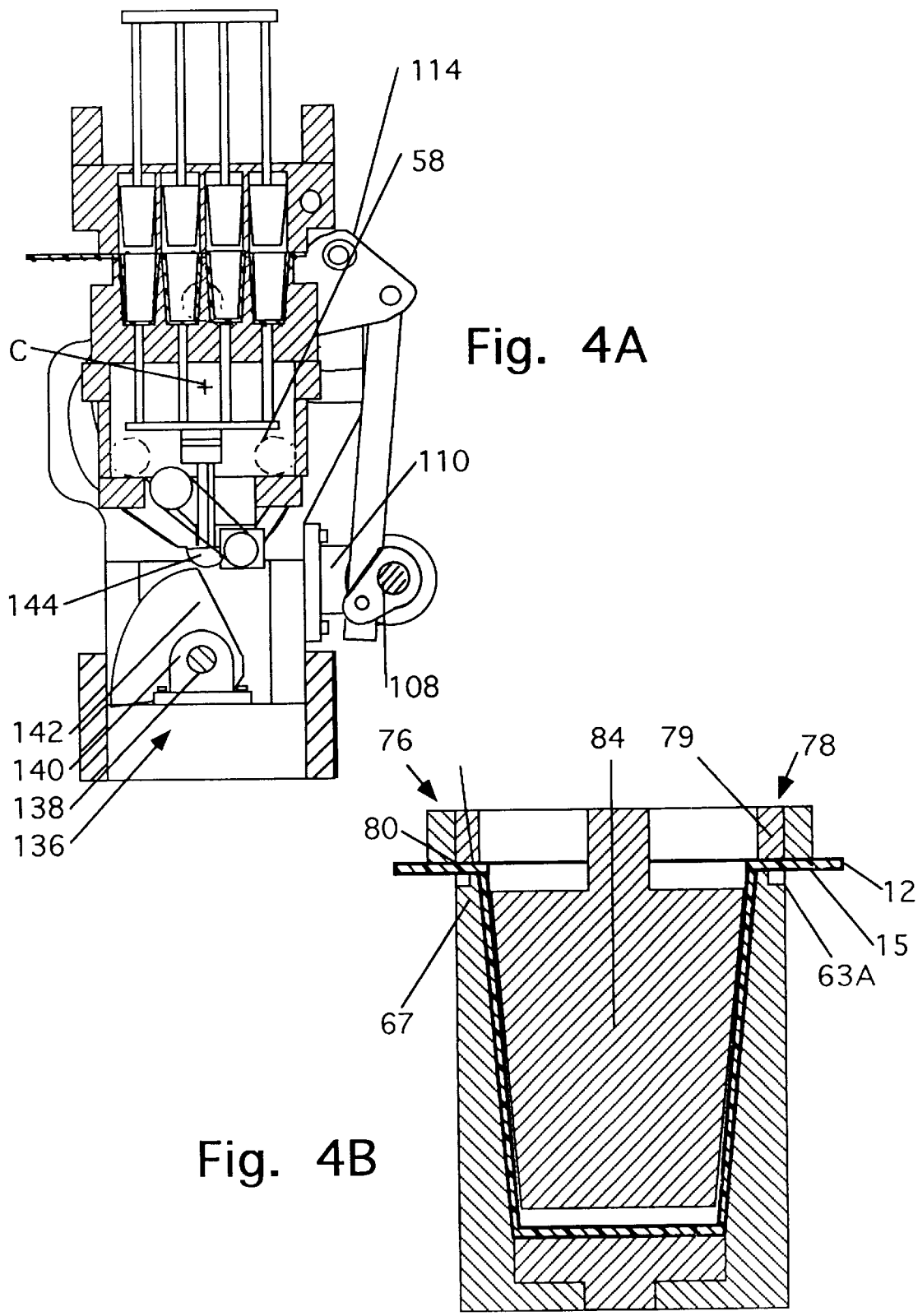
FIG. 4A is a fragmentary sectional side view, similar to FIG. 2, illustrating the mold and trim die assembly in preliminary forming positions engaging opposite sides of the sheet just prior to reaching the forming position illustrated in FIG. 2.
FIG. 4B is a greatly enlarged fragmentary sectional side view more particularly illustrating only one of mold cavities in the preliminary forming position illustrated in FIG. 4A.
Figure 15:
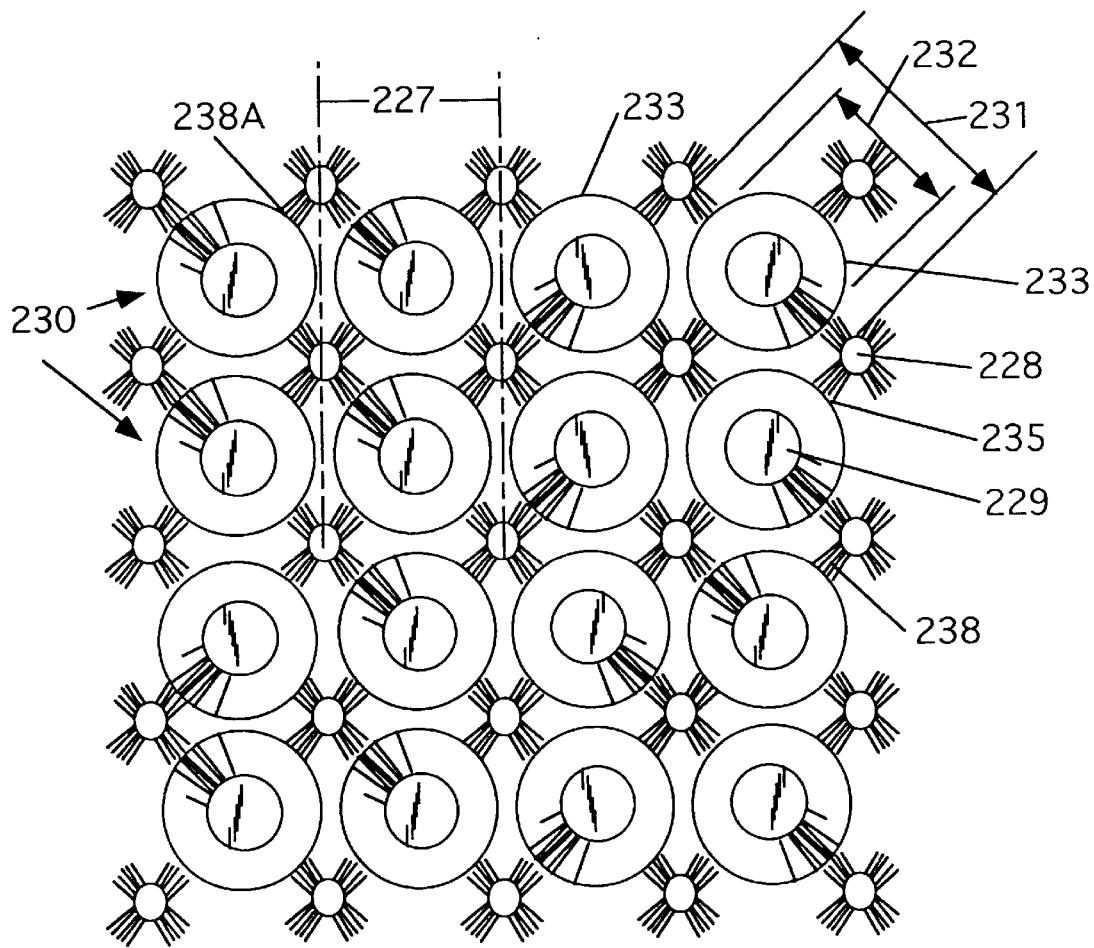
FIG. 15 is a further greatly enlarged end view of the stacker, taken along the line 15—15 of FIG. 2A.

Each upper mold sheet engaging portion 78 also includes an internally disposed, annular clamp and stripper bar, generally designated 79, mounted for vertical movement relative to the upper mold 74 between the stripping position, illustrated in FIG. 4B flush with the annular knife edge 80 to assist in stripping the severed article A from the upper mold 74 and retracted positions when the lower mold 60 is moved upwardly to the mold and trim positions illustrated in FIGS. 5A, 5B, and 6A, 6B, respectively, to form and sever articles A. A pressurized air chamber, schematically designated 81, is provided on the upper mold 74 for selectively applying pressure to the upper side of an annular, clamp and stripper bar 79. When air pressure from source 81 is not directed to the top side of each stripper bar 79, each annular clamp and stripper bar 79 is allowed to axially recess upwardly to allow the article A to be formed and severed. When air pressure is applied to the top side of each stripper bar 79, the stripper bar 79 will move downwardly to the article stripping position illustrated in FIG. 5B to assist in expelling the rim 233 (FIG. 15) of the article A out of the upper mold 74.

Trim die alignment mechanism, generally designated 93, is provided for precisely positioning and aligning the upper and lower mold and trim dies 46 and 48, when closed, and includes a pair of laterally spaced apart vertical alignment pins, 95 mounted on the lower platen 50, via blocks 97 for receipt in a complementally formed, vertical guide recesses provided in block 97A mounted on the underside of the frame of the upper platen 66.

Mechanism for Vertically Moving Lower Mold and Trim Die

Figure 8:
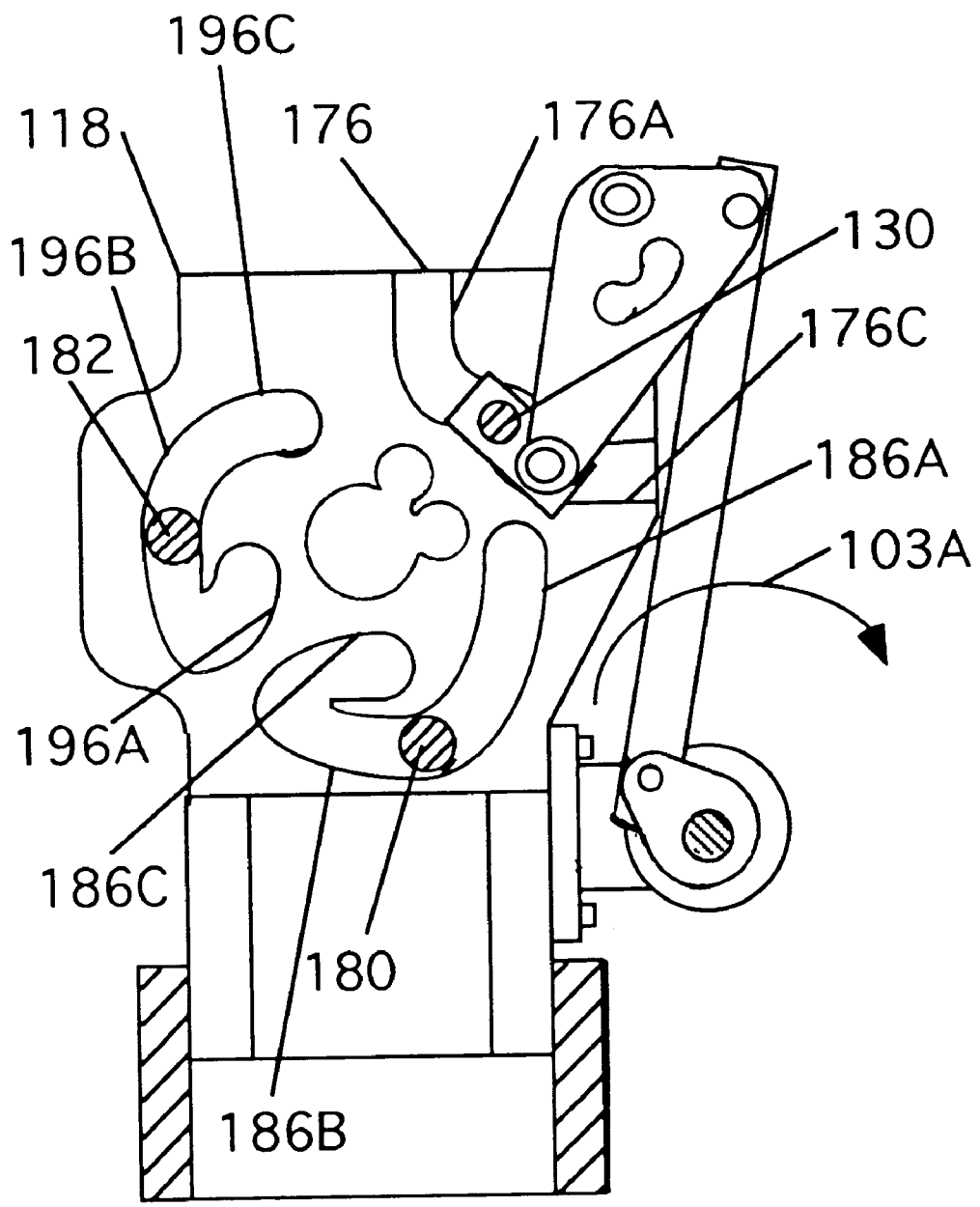
FIG. 8 is a sectional side view similar to FIG. 7, illustrating the camming mechanism in a slightly further lowered position at which time the lower mold and trim die has rotated one-half of its total rotation to the position illustrated in FIG. 8A.
Figure 8A:
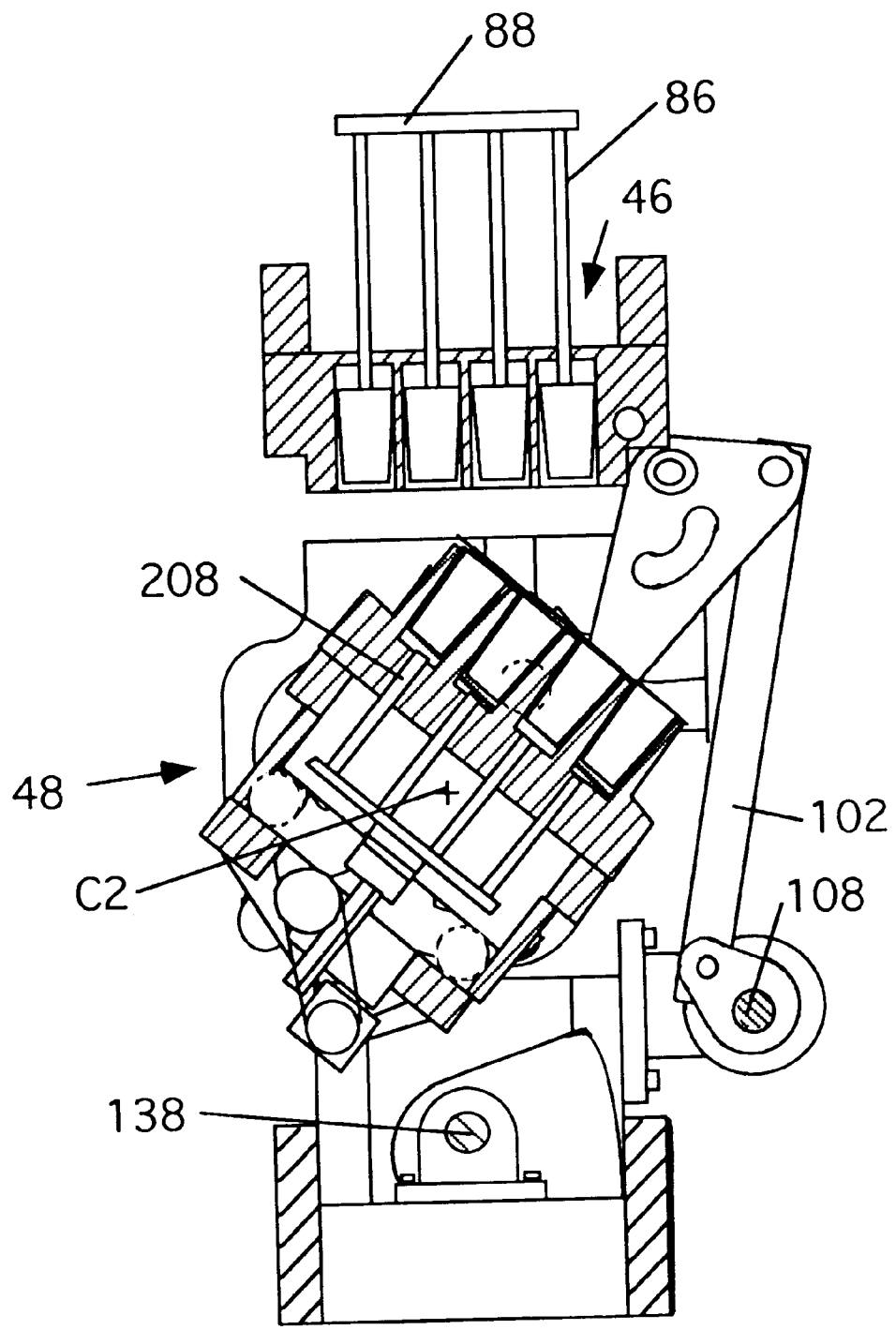
FIG. 8A is a sectional side view, similar to FIG. 7A, illustrating the position of the lower mold and trim die in its lowermost position when the cam mechanism is in the position illustrated in FIG. 8.
Figure 14:
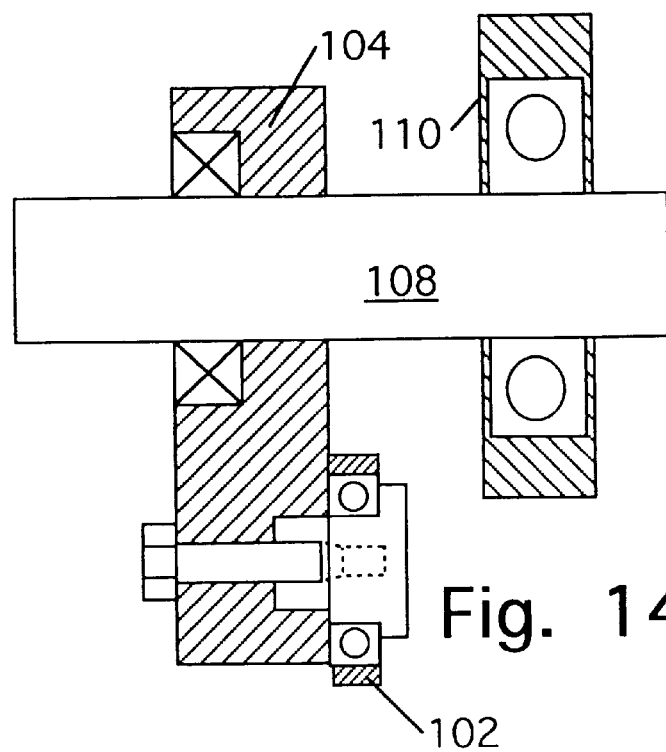
FIG. 14 is a further enlarged fragmentary sectional view of another portion of the camming mechanism, taken along the section 14—14 of FIG. 5.

Apparatus, generally designated 100 (FIG. 5), is provided for vertically moving the lower mold and trim die 48 through a vertical stroke 101 (FIG. 11) between the lowermost position illustrated in FIG. 8A, removed from the sheet 12, and the raised, sheet severing position, illustrated in FIGS. 6A and 6B and includes a pair of laterally spaced apart upstanding links 102 each having a lower end pivotally coupled to another link 104 via a pivot pin 106. The links 104 are fixed to a drive shaft 108 which is journaled in bearings 110 (FIG. 14) mounted on frame bars 42. A motor 109 (FIG. 1) is provided for selectively driving the drive shaft 108, via a gear box 109A, in opposite directions in the to-and-fro swinging paths of travel, represented by the arrows 103 and 103A.

Figure 12:
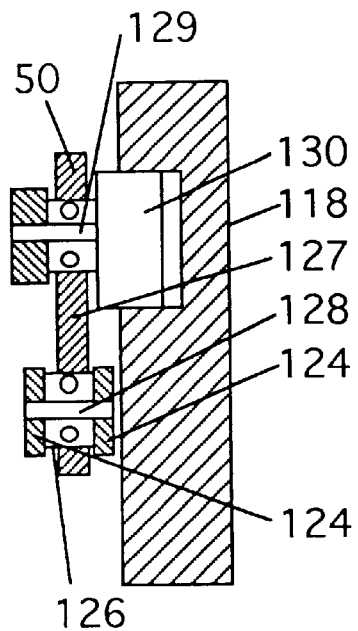
FIG. 12 is a further enlarged fragmentary front sectional view of a portion of the camming mechanism, taken along the section line 12—12 of FIG. 5.
Figure 13:
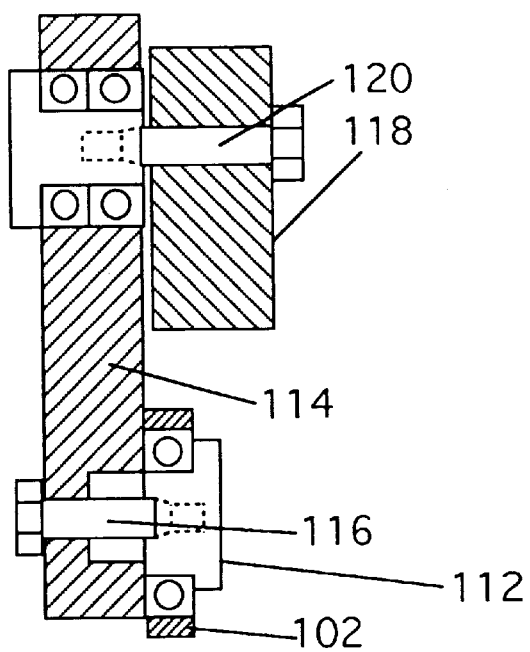
FIG. 13 is a further enlarged fragmentary front sectional view of another portion of the camming mechanism, taken along the section line 13—13 of FIG. 5.

The upper ends 112 of links 102 are each pivotally mounted to one end of a rocker plate 114 via a pivot pin 116. The rocker plates 114 are pivotally mounted on a pair of frame supported, laterally spaced apart cam plates, generally designated 118, via pivot pins 120. The opposite end 122 of each rocker plate 114 is bifurcated and includes a pair of laterally spaced apart legs 124 defining a vertical slot 126 (FIG. 12) which receives one end of a link 127 that is pivotally coupled thereto via a pivot pin 128.

The opposite end of each link 127 is mounted to a shaft or pin 129 which, at one axial end thereof, mounts a cam follower roller 130 and, at its opposite axial end, is fixed to the lower platen 50. As the links 104 and the links 102 successively move between the positions, illustrated in FIGS. 4A–10A, respectively, the rocker plates 114 will successively swing between the positions illustrated in FIGS. 4–10, respectively, thereby successively moving the lower mold and trim die assembly 34 between the various successive positions illustrated in FIGS. 4A–10A, respectively. The lower mold and trim die 48 includes a center of mass C (FIG. 11) which vertically moves through a total vertical stroke 101 between the lowermost position, illustrated in FIG. 8A, and the uppermost trim position, illustrated in FIG. 6A.

A kidney shaped opening 119 is provided in the rocker plates 114 for receiving the rail support members 31 which support the laterally spaced sheet support rails 24 that supply the sheet 12 at the mold and trim station.

The cam follower rollers 130 are mounted on the vertical cam plates 118 for movement as will be more particularly described hereinafter.

Trim Cam Mechanism

Trim cam mechanism, generally designated 136, is provided for assisting the drive shaft 108, the links 102, and the rocker plates 114 in incrementally upwardly indexing the lower mold and trim die 48 from the preliminary forming position (FIGS. 4A and 4B) to the final forming position (FIG. 5B) and tightly clamp the sheet 12 between the opposing, upper and lower mold surface portions 78 and 67, respectively, and thence to the sheet trimming positions illustrated in FIGS. 6A and 6B.

During the upward movement of lower mold and trim die 48 from the preliminary forming position illustrated in FIG. 4B by cam mechanism 136, the sheet 12 is partially severed along the borders b of the articles A and each stripper bar 79 is moved slightly upwardly, as illustrated in FIGS. 5A and 5B.

The trim cam mechanism 136 includes a drive shaft 138, mounted in frame supported bearings 140, which mounts a pair of axially spaced apart, fan-shaped cams 142. The drive shaft 138 is continuously rotated via a servomotor and gear box, schematically designated 165 and 165A, respectively. A pair of cam follower rollers 144 is journaled on shafts 146 mounted on a pair of clevises 148 depending from the underside of the lower platen 50.

Figure 16:
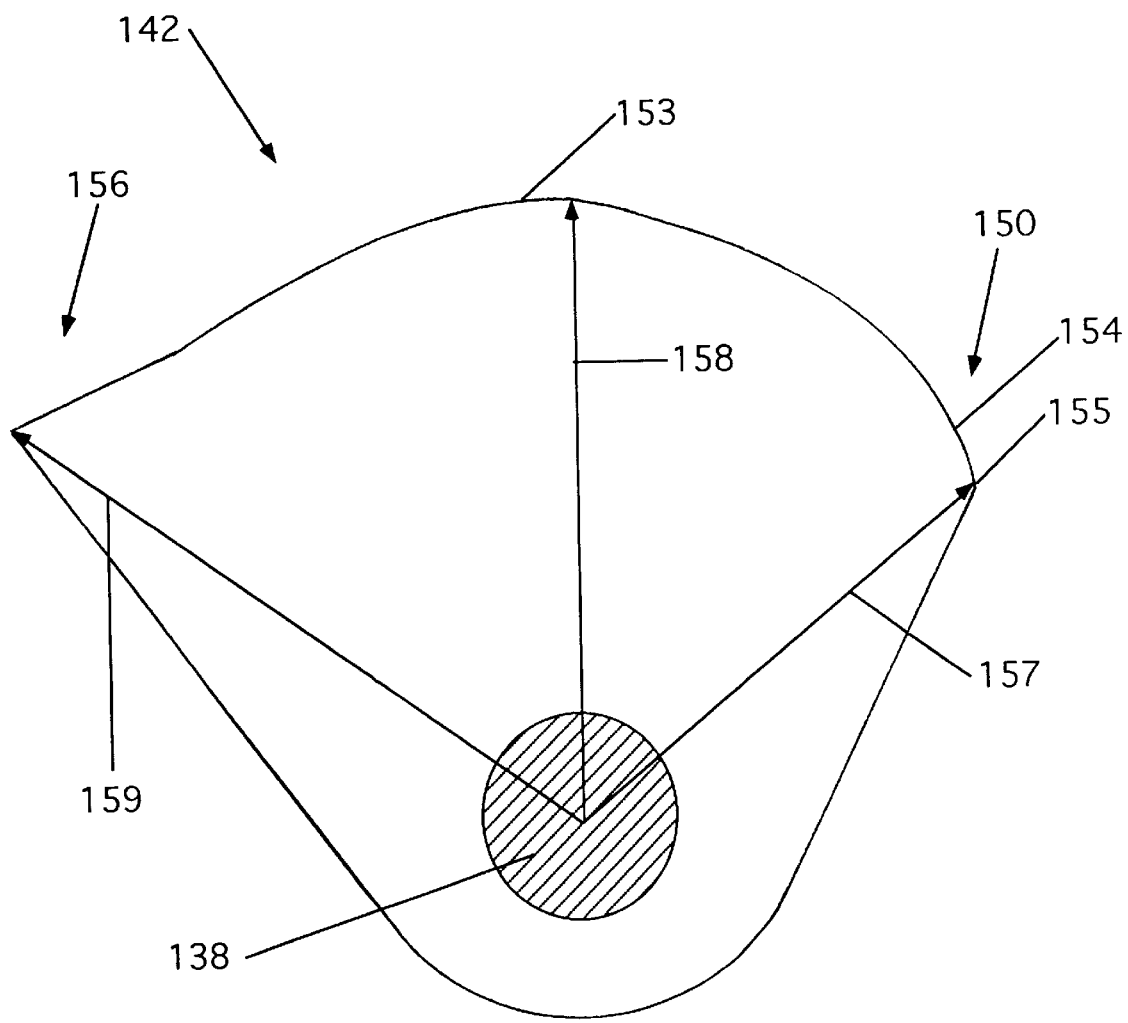
FIG. 16 is a greatly enlarged fragmentary side elevational sectional view of the fan shaped trim cam, taken along the line 16—16 of FIG. 1.

The cam 142 has a main arcuate cam surface 153 (FIG. 16) having a radius 158. The leading edge portion 150 of cam 142 has a slightly radially reduced, beveled camming surface 154 with a leading edge 155 having a slightly lesser radius 157. The beveled lead cam surface 154 merges into the main cam surface 153 and incrementally smoothly and gradually raises the lower platen 50 and lower mold and trim die 48 a few thousandths of an inch at the beginning of the engagement of the cam 142 and follower roller 144 to complete closure of the mold 60, partially sever the borders b of the articles A, as illustrated in FIG. 6B, and seal the sheet 12 between the upper and lower molds 74 and 60, respectively in the positions illustrated in FIGS. 5A and 5B.

The drive shaft 108 and the links 102 vertically move the lower mold and trim die 48 to the forming position illustrated in FIG. 4A but they, alone, do not have sufficient power to reliably hold the mold and trim die 48 in the forming position. When the follower rollers 144 travels on the main cam surfaces 153, the lower mold and trim die 48 is locked in the final forming position (FIG. 5A).

The drive shaft 108, rocker plates 114, and the links 102, as they continue to rotate, do not alone have sufficient power to upwardly index the lower mold and trim die 48 to reliably cut through the sheet 12 to sever the articles A.

To assist in moving the mold and trim die 48 upward a distance of a final few thousandths of an inch from the final mold position (FIG. 5A and 5B) to the sheet severing position illustrated in FIG. 6A, the cam 142 also includes a trailing, upwardly beveled trim cam portion 156, which has a slightly increasing radius 159 relative to the radius 158 of the main cam surface 153. The system is operated in timed sequence such that at the termination of the forming cycle, the trailing trim cam portion 156 further upwardly incrementally indexes the lower mold and trim die 48 from the mold position, illustrated in FIGS. 5A and 5B, to the trimming position illustrated in FIG. 6A and 6B whereby the borders b of the articles A are trimmed immediately adjacent the rims 233 of the articles A to completely sever the articles A from the sheet 12.

Apparatus, generally designated 163, is provided for driving the shaft 138 in timed sequence with the driving of shaft 108 by motor 109 such that when the fan shaped cams 142 bear against the cam follower rollers 144, the shaft 108 is stationary and as soon as the trailing cam portions 156 of cams 142 clears the cam follower rollers 144, the motor 109 for driving shaft 108 is again energized to vertically move the lower platen and lower mold and trim die 48. The timing of the drive system is such that the link drive shaft 108 will cease rotation when the cam follower rollers 144 have engaged the beveled, lead cam portion 154. The control apparatus 163 also controls the servomotor 165 and gearbox 165A drivingly coupled to the drive shaft 138.

Lower Trim Die Rotating and Horizontal Displacing Mechanism

Figure 10A:
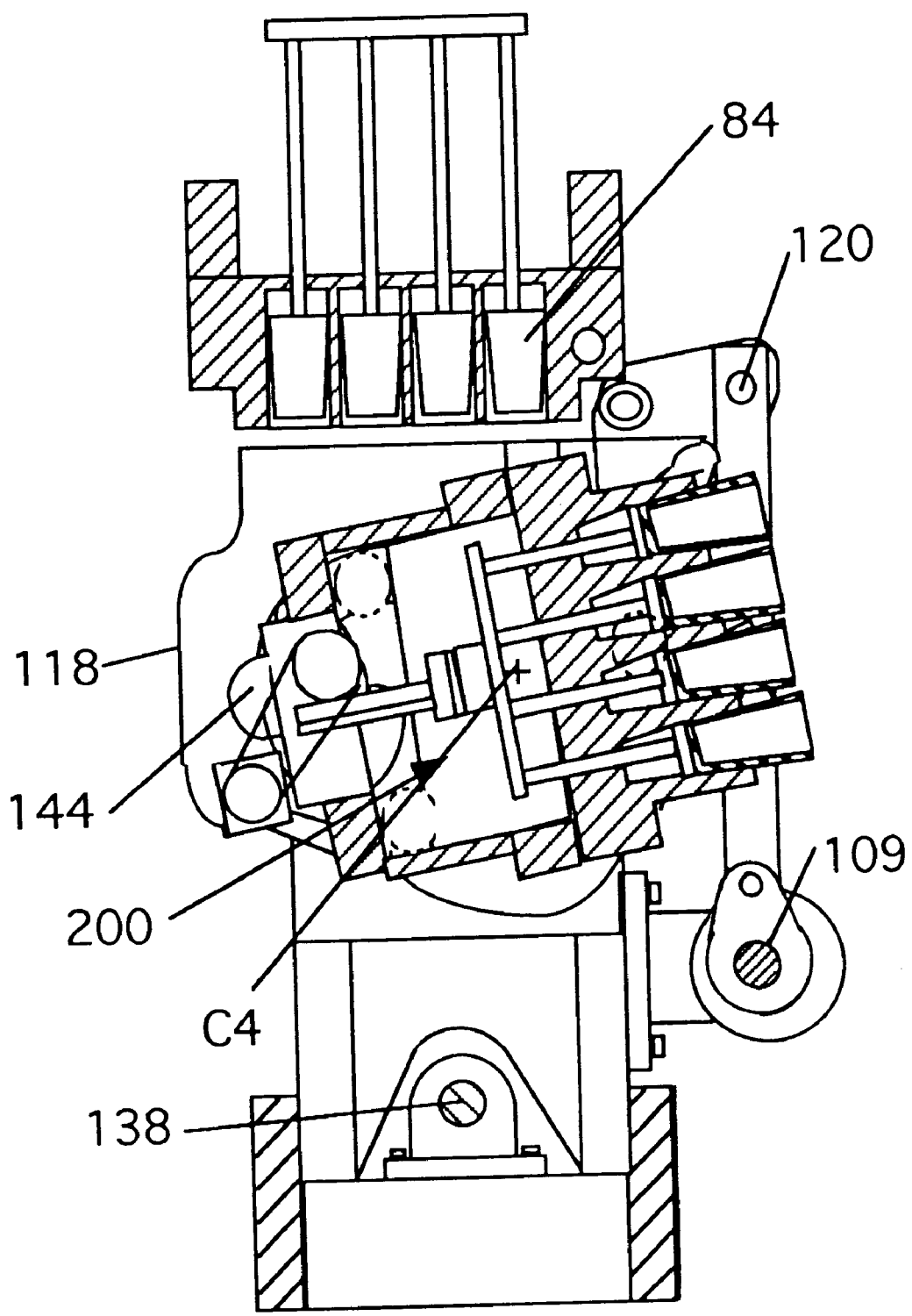
FIG. 10A is a sectional side view, similar to FIG. 9A, illustrating the lower mold and trim die in a horizontally displaced discharge position when the camming mechanism is in the position illustrated in FIG. 10.
Figure 11:
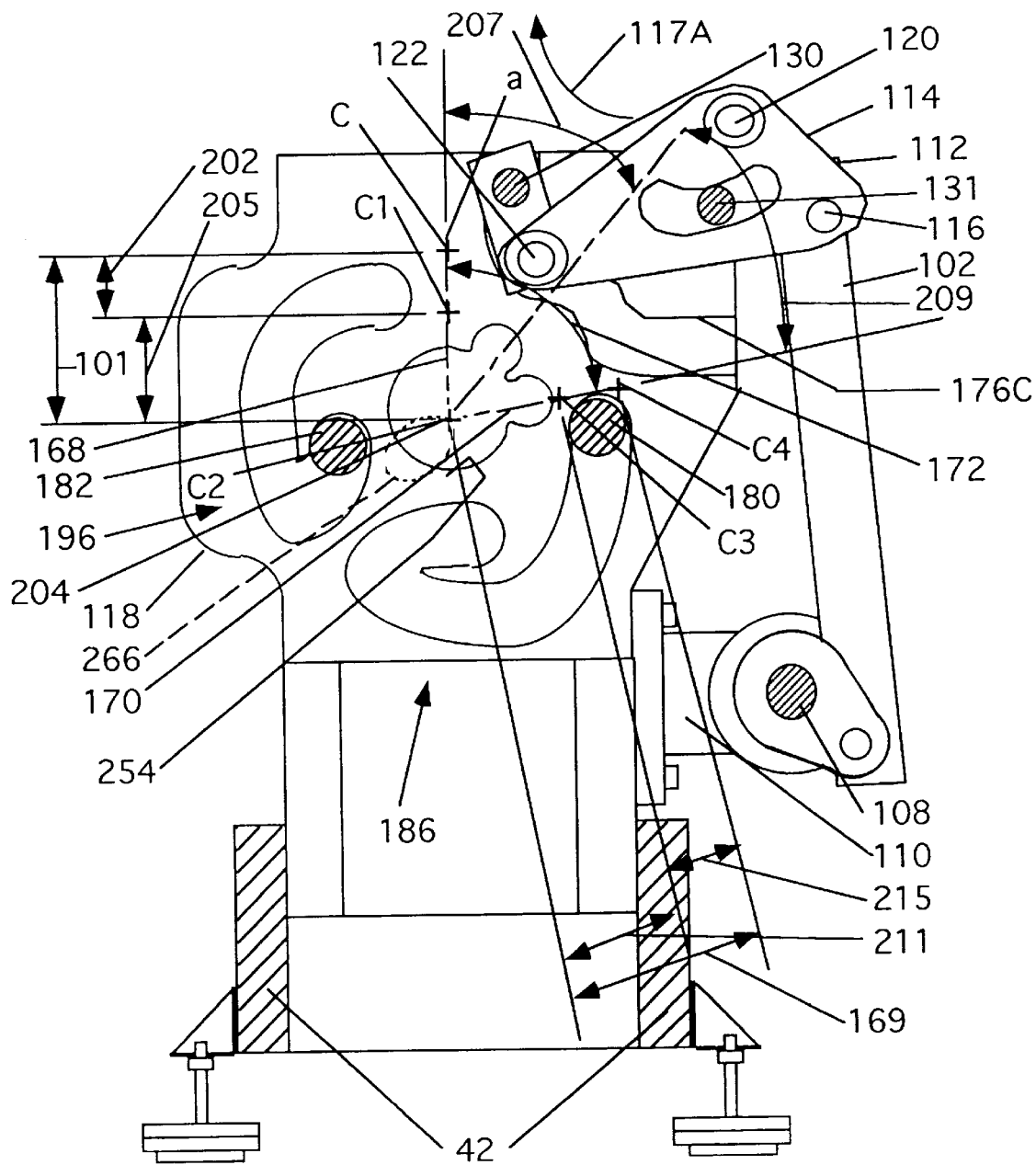
FIG. 11 is a greatly enlarged sectional side view, similar to FIG. 10, illustrating the position of the camming mechanism when the cycle has been completed and the mold and trim die assembly is returned to the final mold position illustrated in FIG. 11A.

Lower trim die rotating and displacing mechanism, generally designated 166, is provided for partially rotating the lower mold and trim die 48 and to bodily guide the lower mold and trim die 48 in a first vertical path, represented by the line 168, and thence transversely horizontally, through a stroke 169, in a second linear path 170 which extends at an 80 degree angle 172 relative to the vertical path 168 (FIG. 11). Rotation of the mold and trim die 48 will reorient the articles A supported therein from the vertical orientation illustrated in FIGS. 5A, 6A and 7A, to a more nearly horizontal orientation illustrated in FIGS. 9A and 10A in alignment with the stacker 16.

The trim die rotating mechanism 166 includes the pair of cam follower rollers 130 mounted on opposite sides of the lower platen 50 via a pair of pivot pins 129. The pins 129 function as the main drive pins for transferring the vertical motion of links 102 and rocker plates 114 to vertical motion of the lower mold and trim die 48 but also function, with cam follower rollers 130, to rotate the lower mold and trim die 48 about an axis intersecting the center of mass C of the lower mold and trim die 48.

The cam follower rollers 130 are received in a pair of multi-angled cam tracks, generally designated 176, comprising openings cut in the pair of cam plates 118. The cam tracks 176 each includes a vertical linear track section 176A, a downwardly and horizontally inclined curved, track section 176B, and a horizontally disposed linear track section 176C.

The mold rotating mechanism 166 also includes pairs of circumferentially displaced idler cam follower rollers 180 and 182 mounted on shafts 184 and 185, respectively, which are fixed to opposite sides of the lower platen 50. The cam follower rollers 180 and 182 are rollingly received in multi-angled cam tracks 186 and 196, respectively, comprising openings cut in the cam plates 118. Each cam track 186 has a vertical linear cam track section 186A, an intermediate curvilinear cam track section 186B, and a horizontally extending, linear track section 186C.

The cam follower rollers 182 are disposed in the cam follower tracks 196 each having a vertically disposed, linear cam track section 196A, a curvilinear intermediate cam track section 196B and a terminal horizontal linear track section 196C for guiding the follower roller 182 in the path of travel defined by the track 196.

The cam follower rollers 130, 180 and 182, are concurrently located in vertical track sections 176A, 186A and 196A, respectively, intermediate curvilinear track sections 176B, 186B and 196B, respectively, and in vertical track sections 176C, 186C and 19C, respectively, in the positions illustrated in FIGS. 5–7, FIG. 8 and FIGS. 9–10, respectively.

Figure 6:
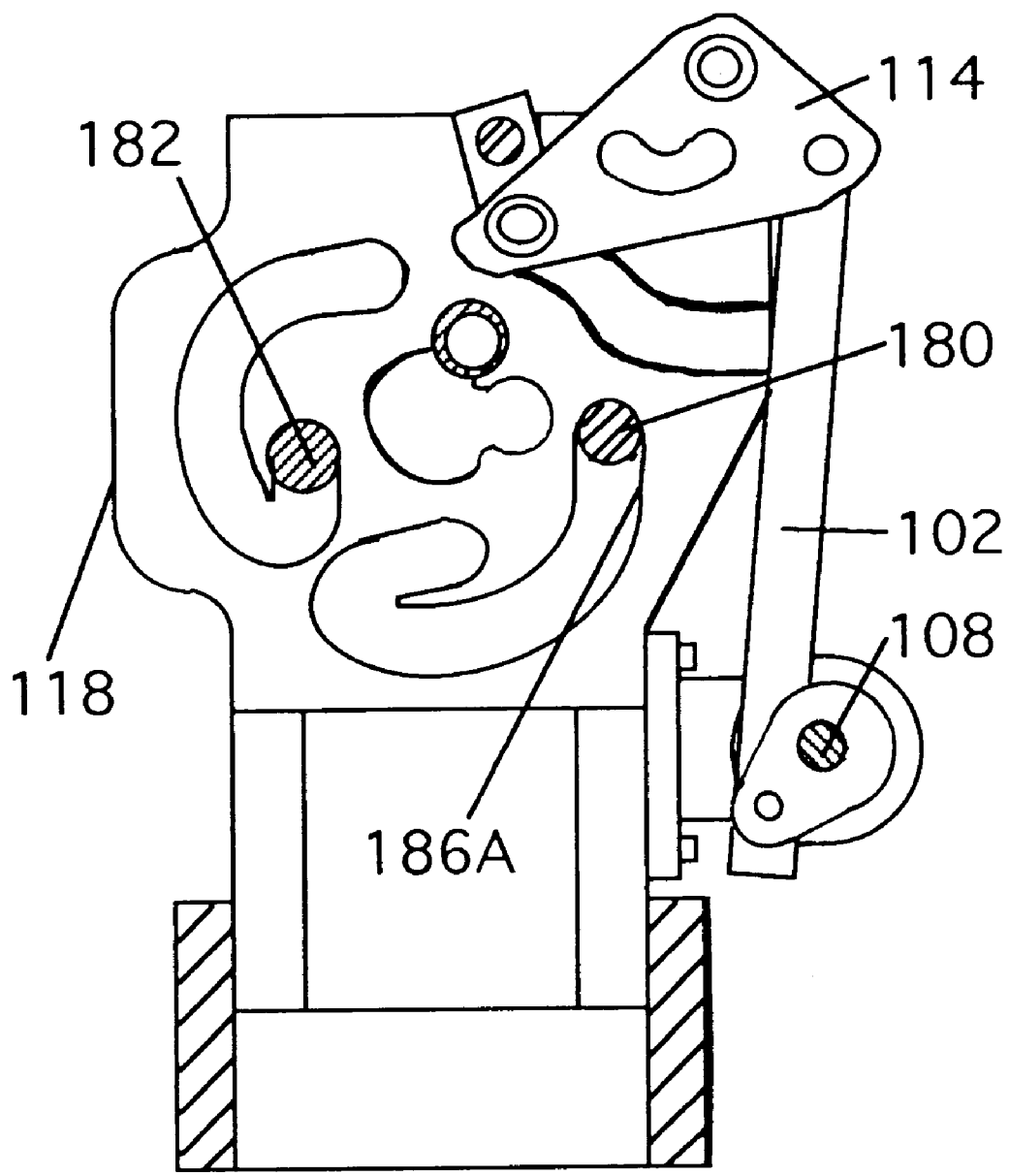
FIG. 6 is a sectional side view, similar to FIG. 5, illustrating the camming mechanism in a position it assumes when the mold and trim die assembly is moved to the trim position illustrated in FIG. 6A.
Figure 7:
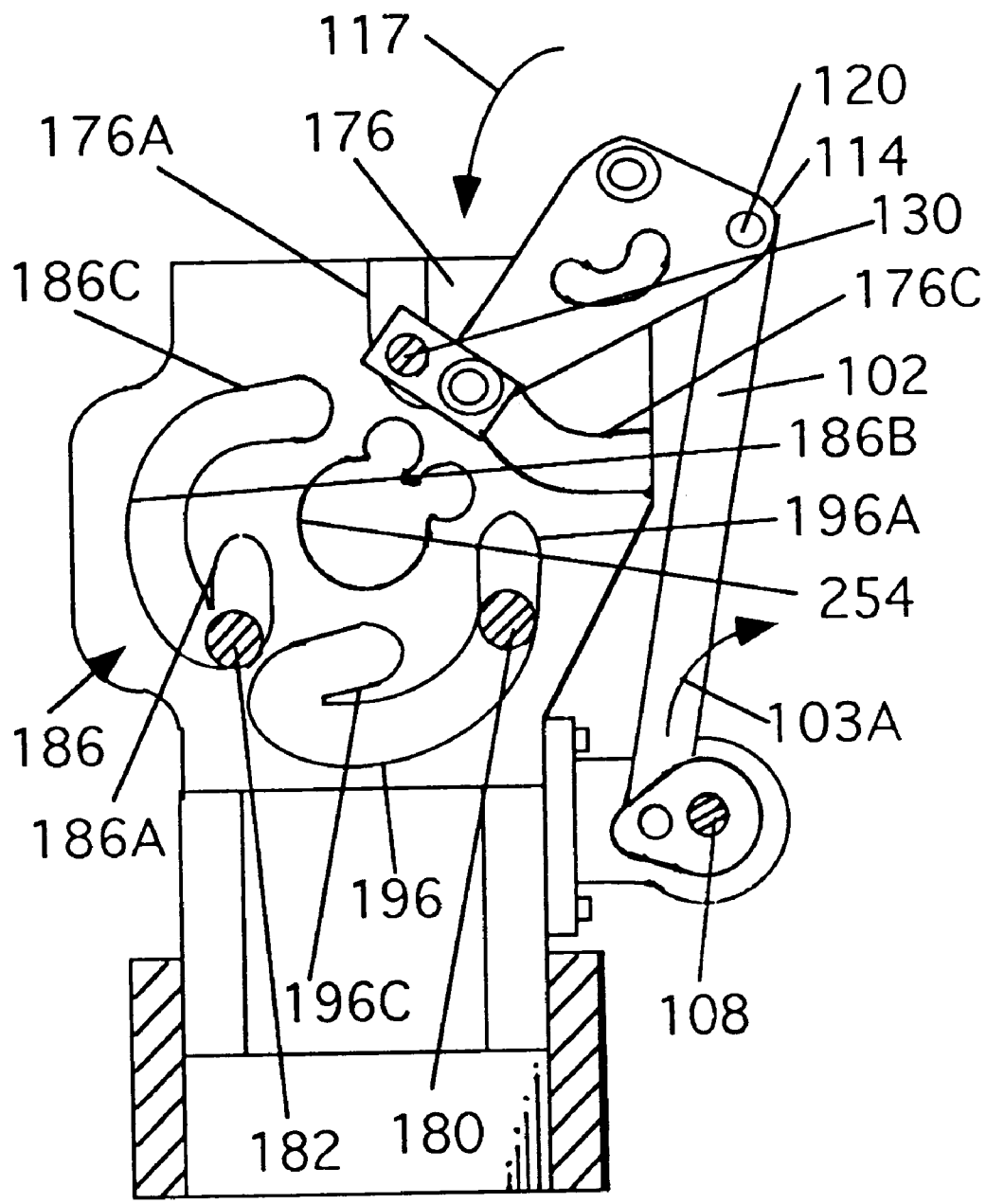
FIG. 7 is a sectional side view, similar to FIG. 6, illustrating the camming mechanism in a further adjusted position when the mold and trim die assembly is in the position illustrated in FIG. 7A.
Figure 10:
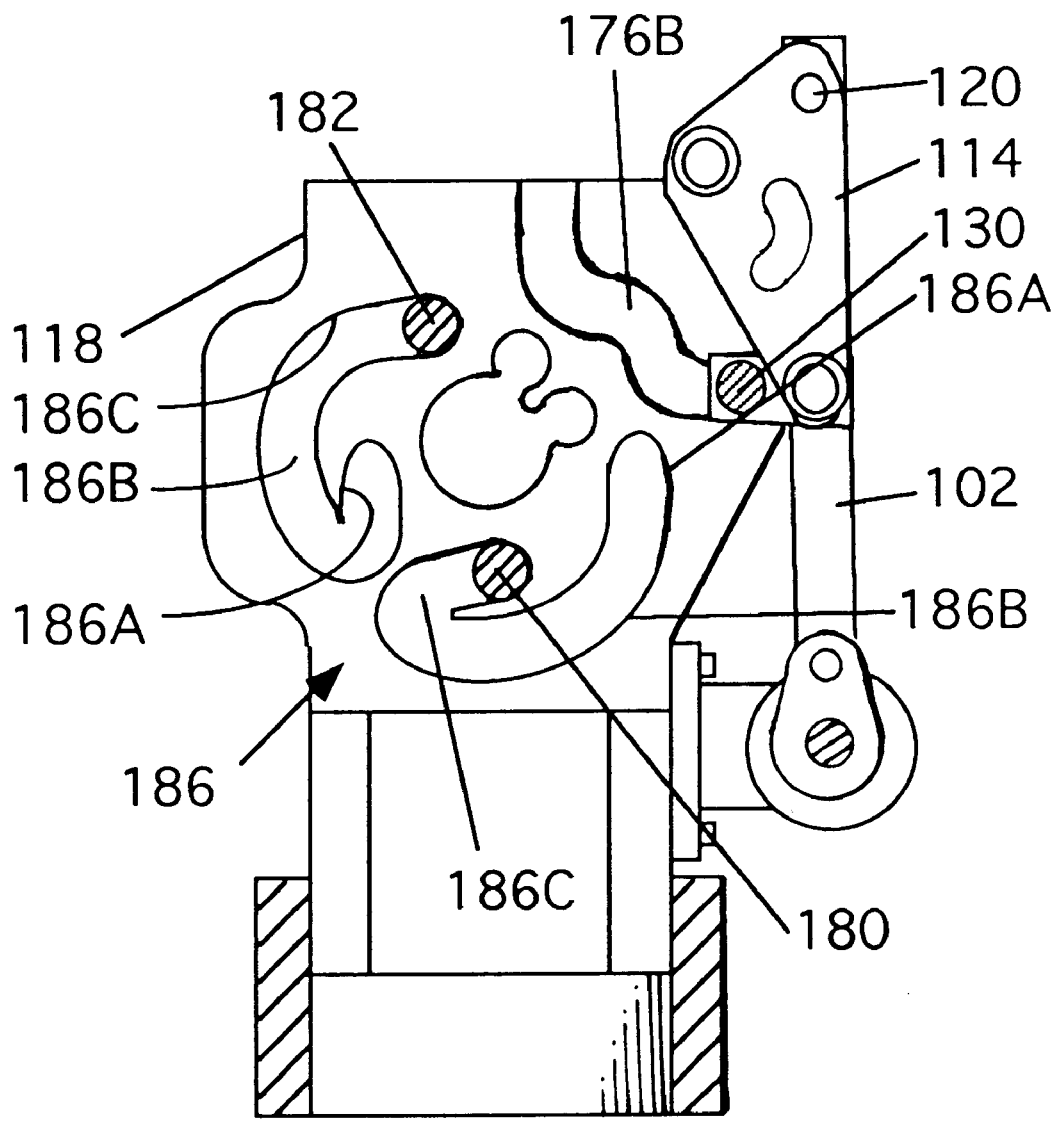
FIG. 10 is a sectional view, similar to FIG. 9, but illustrating the position of the camming mechanism when the lower mold and trim die has been moved linearly to the right to the discharge position to nest the articles in the lower mold with previously discharged articles at the stacking station.

As the cam follower rollers 130, 180 and 182 concurrently move from the trim positions, illustrated in FIG. 6 to the discharge positions, illustrated in FIG. 10, the lower mold and trim die 48, the center of mass C, and the axis a, will be moved downwardly along the vertical path 168 and thence horizontally along the horizontal linear path 170. As the follower rollers 130, 180 and 182 concurrently travel the length of vertical cam track sections 176A, 186A and 196A, respectively, from the positions illustrated in FIG. 6 to the positions illustrated in FIG. 7, the lower mold and trim die 48 will not rotate but will, along with center of mass C and axis a, have vertically traveled a distance 202 which is substantially equal to one-third of the total vertical stroke 101 of the mold and trim die 48 and the center of mass C which will have moved to the position designated C1 (FIGS. 7 and 11).

As the follower rollers 130, 180 and 182 concurrently negotiate the first one-half of the intermediate curvilinear track sections 176B, 186B and 196B, respectively, to the positions illustrated in FIG. 8, the lower mold and trim die 48, the center of mass C and the axis a, will have vertically traveled an additional vertical distance 205, which is substantially equal to two-thirds of the total vertical stroke 101 and will have been rotated about the axis a through an angle 207 substantially equal to one-half of the total rotational angle 172.

As illustrated in FIGS. 8 and 11, when the rollers 130, 180 and 182 have concurrently negotiated the first one-half of the cam track sections 176B, 186B and 196B, respectively, the center of mass C of the mass of the lower mold and trim die 48 and the axis a will be in the position designated C2 at the apex 204 of the juncture of the vertical and horizontal linear paths 168 and 170, respectively (FIGS. 8A and 11).

Figure 9:
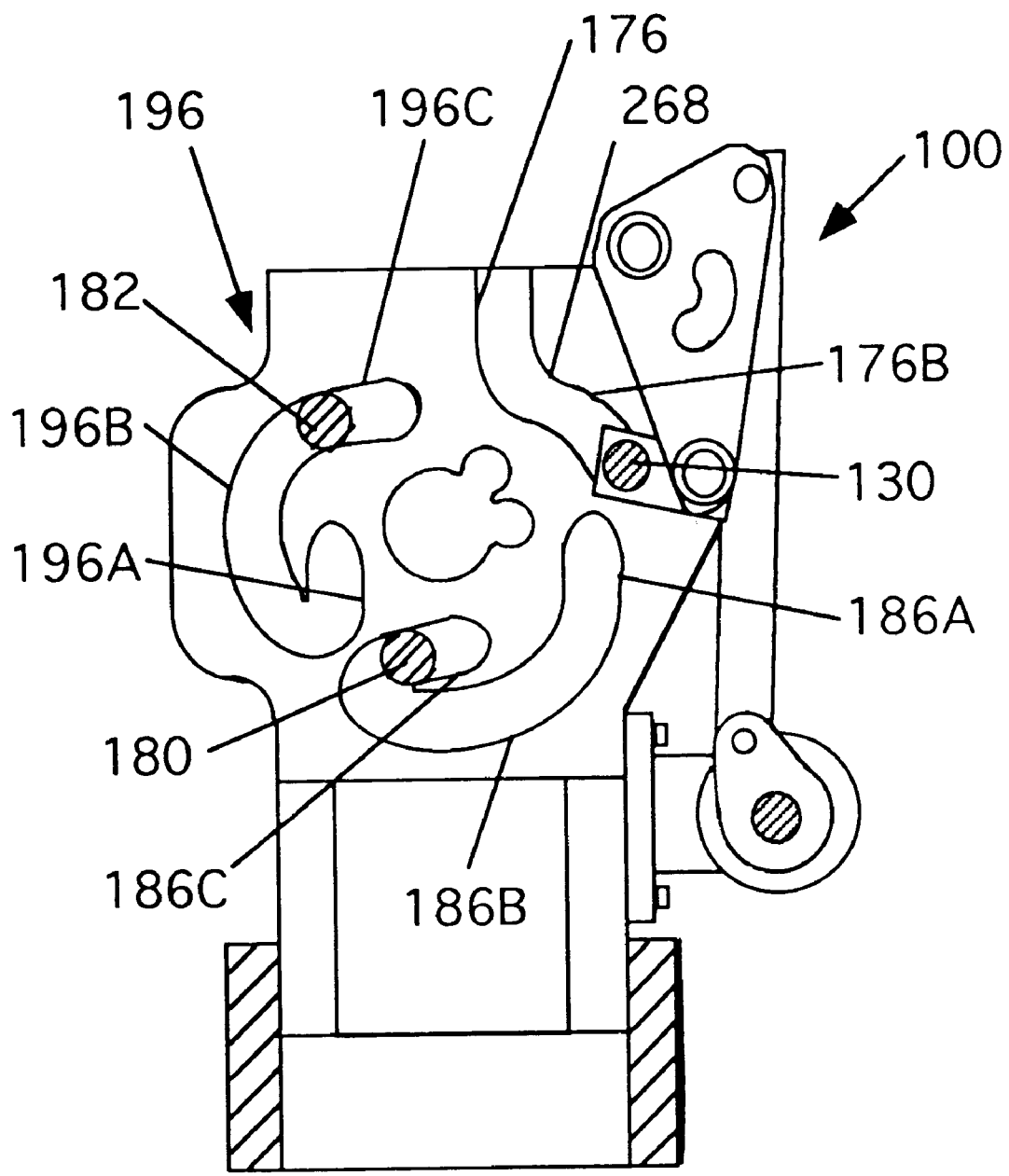
FIG. 9 is a sectional side view, similar to FIG. 8, illustrating the camming mechanism in a slightly adjusted, fully rotated position at which time the lower mold and trim die has been completely rotated.
Figure 9A:
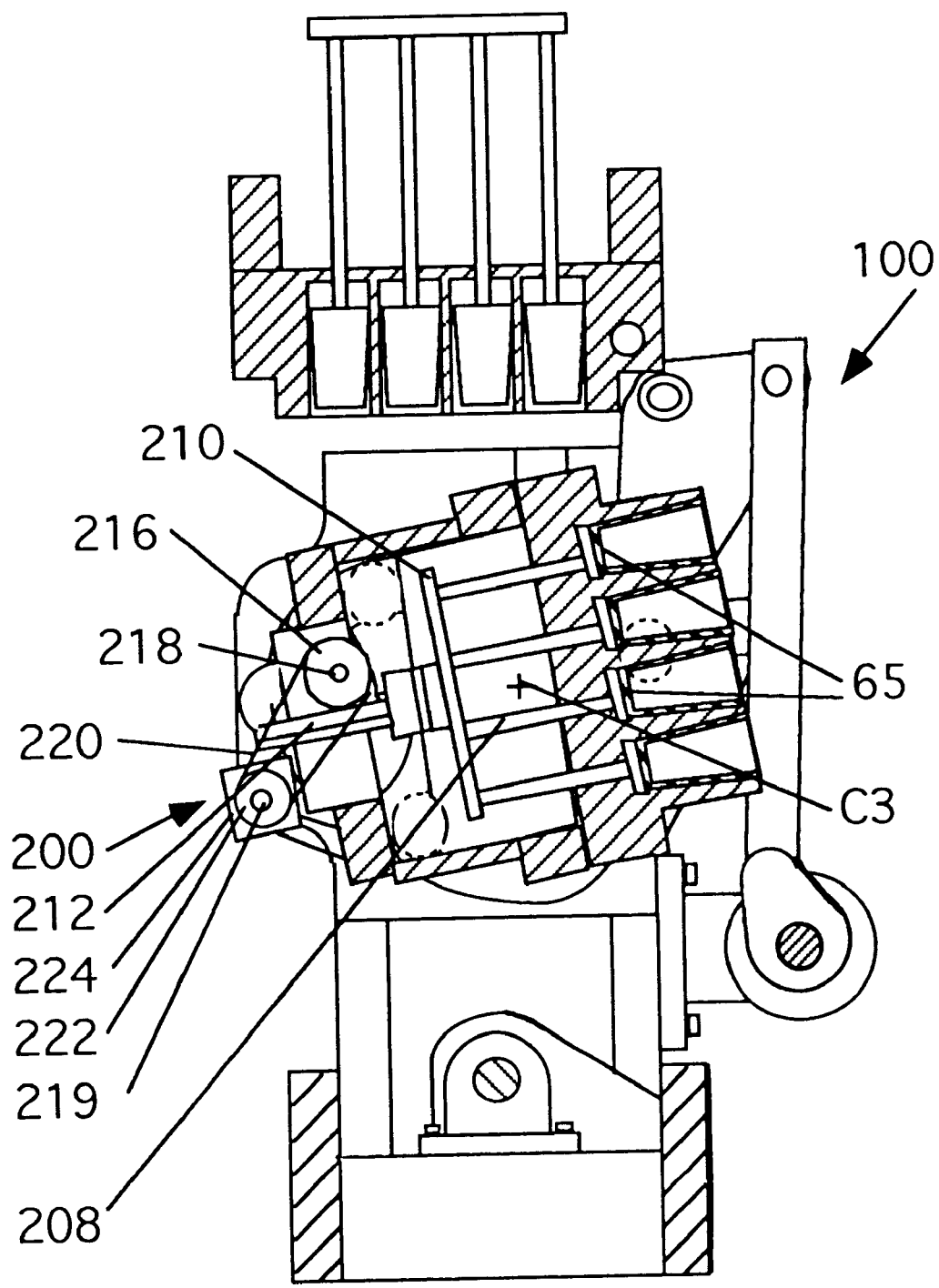
FIG. 9A is a sectional side view, similar to FIG. 8A, illustrating the position of the lower mold and trim die fully rotated when the camming mechanism is in the position illustrated in FIG. 9.

As the cam follower rollers 130, 180 and 182 concurrently negotiate the last half of the cam track sections 176B, 186B and 196B, respectively, the lower mold and trim die 48 will be rotated through an angle 209 substantially equal to angle 207, and will be moved horizontally to the right, as illustrated in FIG. 9A a distance 211 (FIG. 11) substantially equal to two-thirds of the total horizontal stroke 169. The center of mass C and the rotational axis a will be shifted slightly upwardly and horizontally to the position designated C3 (FIGS. 9A and 11).

As the cam follower rollers 130, 180 and 182 concurrently negotiate the horizontally extending linear cam track sections 176C, 186C and 196C, respectively, the mold and trim die 48 will not rotate but will be horizontally and upwardly in a direction toward the upper mold and trim die 48 displaced a distance 215 substantially equal to one-third of the total horizontal stroke 169 to the discharge position, illustrated in FIG. 10, in which the mold cavities 62 and the articles A in the lower mold cavities 62 will be nested with previously discharged article A' held by the stacker 16. At this stage, the center of mass C and rotational axis a will be in the position designated C4 (FIGS. 10A and 11).

Ejector

Apparatus, generally designated 200 (FIG. 9A), is provided for ejecting the articles A which have been formed and trimmed in the lower mold and trim die 48 from the mold and trim die 48 when, the plug assists 84 have been retracted and the mold and trim die assembly 48 has been, lowered, rotated and horizontally displaced to the discharge station 18 in the discharge position illustrated in FIGS. 2A and 10A.

The ejector apparatus 200 includes the lower mold plate 65 forming the bottom wall of each of the female molds 60, mounted on an ejector rod 208 which is fixed to an ejector bar 210. The ejector bar 210 is mounted for to-and-fro reciprocal movement on the lower platen 50 via a pair of ejector racks 212 mounted for to-and-fro sliding movement in guide sleeves 214 fixed to the lower platen 50.

Apparatus is provided for reciprocating the ejector mechanism 200 between the withdrawn, molding position illustrated in FIGS. 4A–9A and the ejecting position illustrated in FIG. 10A, and includes a pinion gear 216 mounted on a shaft 218 and driven by a chain 220 trained around a sprocket wheel 222 fixed to a platen supported shaft 219. The pinion gear 216 is nested with and drives ejector rack 212 as the pinion gear 216 rotates. The chain 220 is driven by a servomotor 224 mounted on a bracket 217 (FIG. 1) fixed to the lower platen 50 and selectively controlled and operated in the timed sequence by the electrical control system schematically 163.

Figure 2:
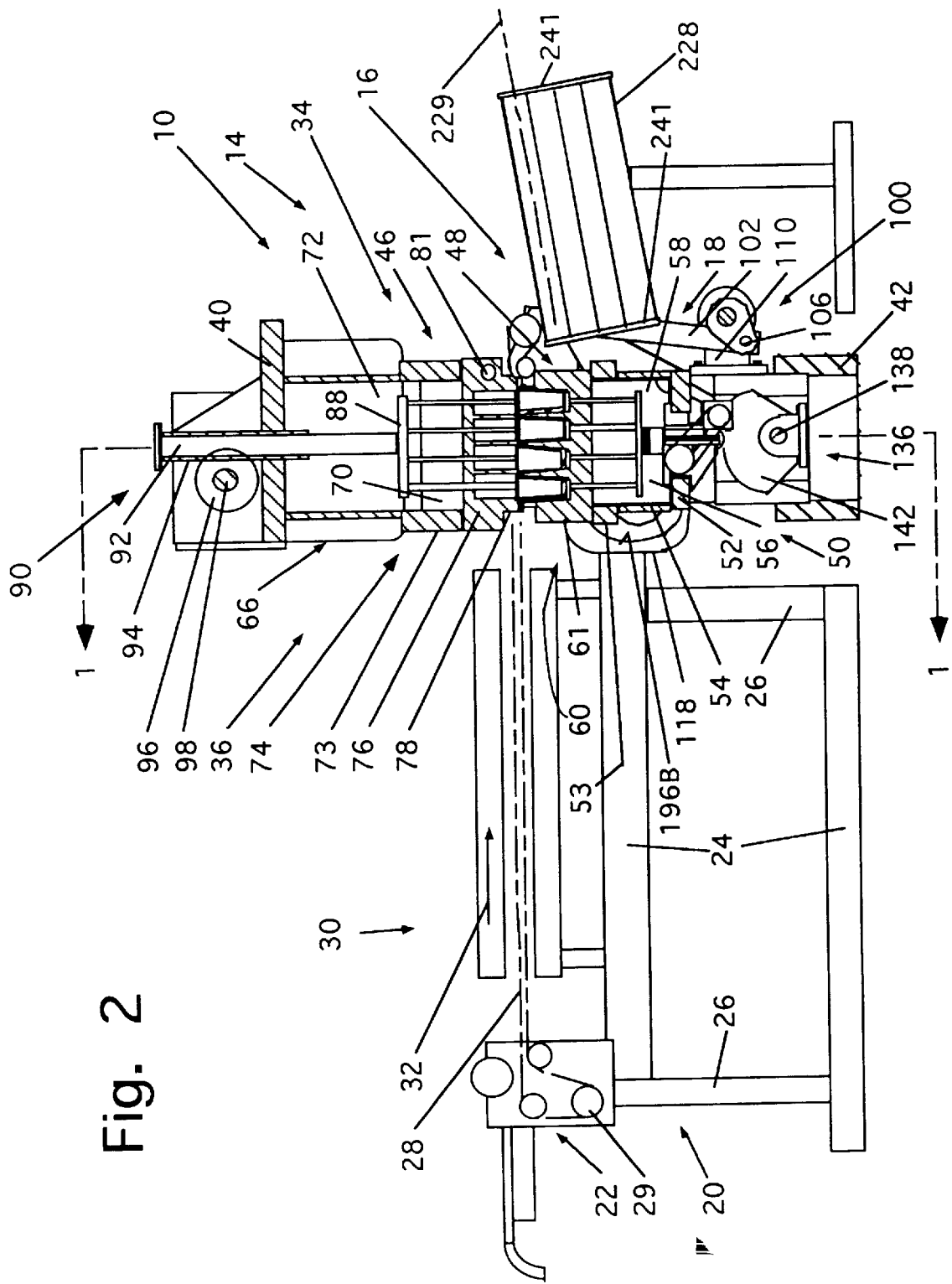
FIG. 2 is a slightly reduced, sectional side view, taken along the section line 2—2 of FIG. 1.
Figure 2A:
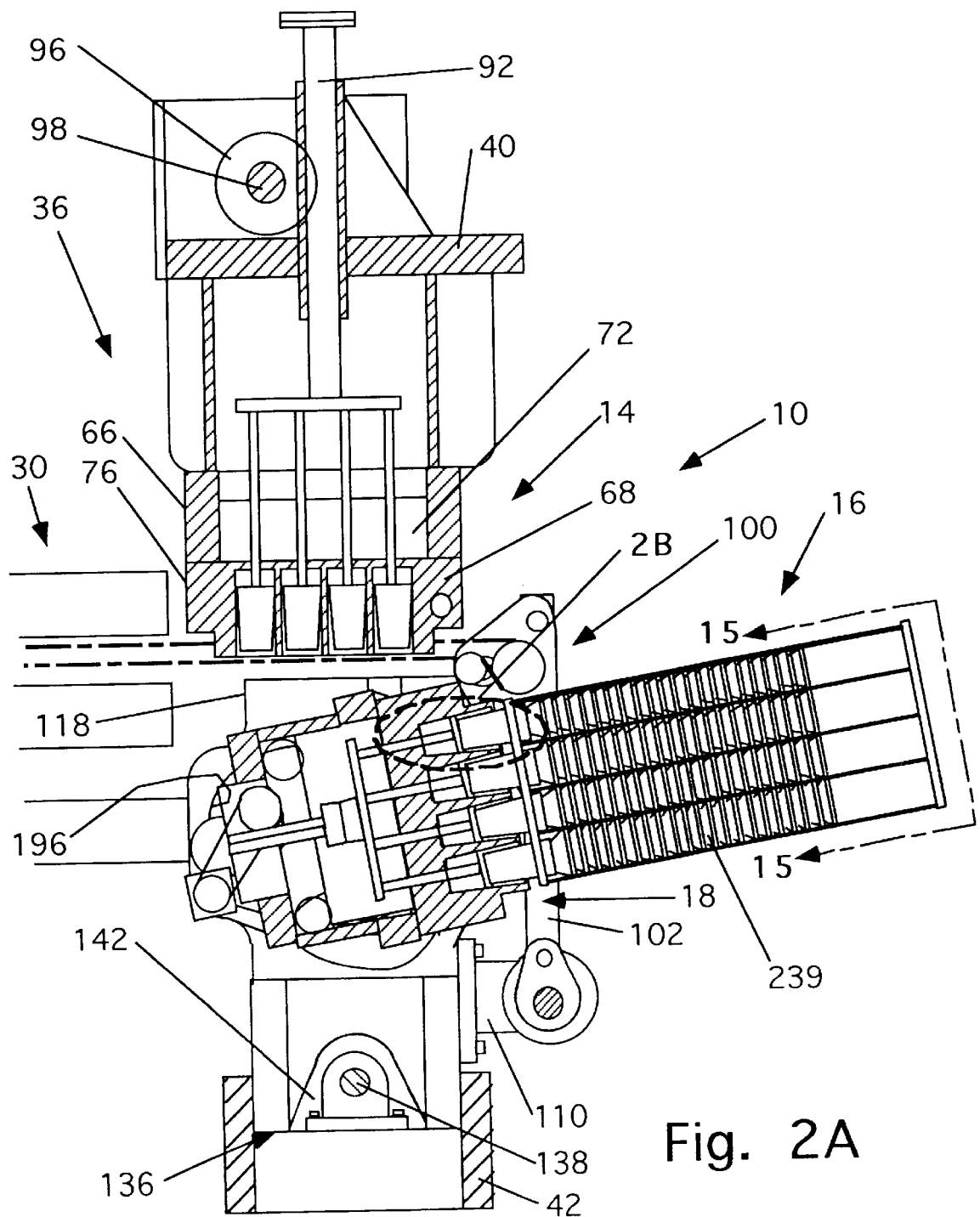
FIG. 2A is a sectional side view, similar to FIG. 2, illustrating the forming, trimming and stacking apparatus in an adjusted discharge position.
Figure 2B:
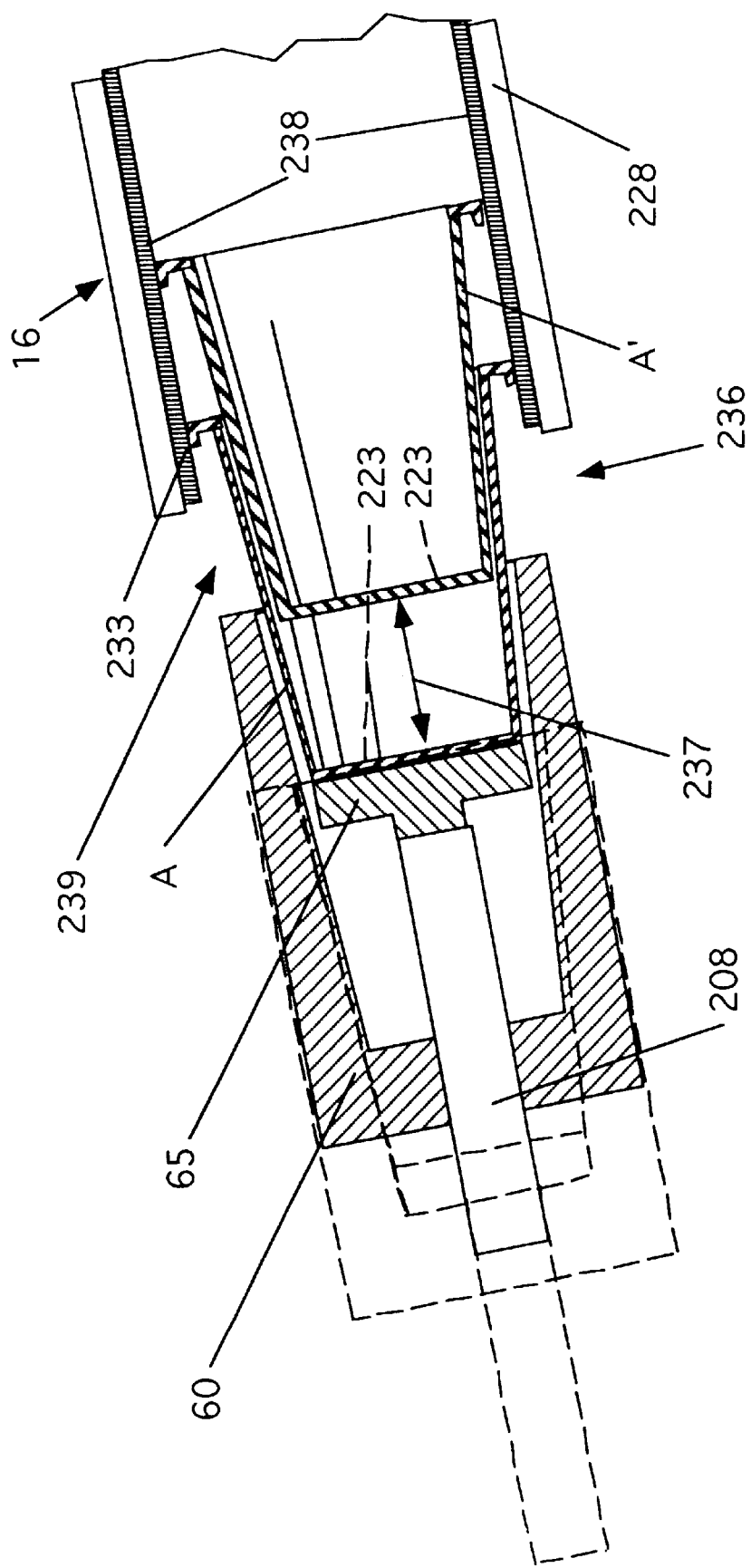
FIG. 2B is a greatly enlarged sectional side view of only one of the molds illustrated in the chain line circle 2B of FIG. 2A.

The eject servomotor 224 is operated by control system 163 in timed sequence with the link drive motor 109 as the ends 67 of the lower mold cavities 62 reach the closed end 223 of the last succeeding articles A' in the stack 236 of previously discharged and stacked articles A in the stacker 16 as illustrated in chain lines in FIG. 2B. The servomotor 224 will cease operation when the lower mold cavities 62 are nested with end most articles A' at the end of the horizontal stroke of travel as illustrated in solid lines in FIG. 2B.

The Stacking Mechanism

A stacker 16 is provided for receiving articles A which have been formed, trimmed and transported to the discharge station 18 and includes a plurality of stacking chutes 230 (FIG. 15) having axes 229 which are axially aligned with the axes 227 of the stacked article A'. Each stacker chute 230 includes a plurality of elongate rods 228 which are coupled to end plates 241 equiangularly arranged about the axis 229 of the chute 230. Opposing rods 228 are spaced apart a distance 231 slightly greater than, the outside diameter 232 of the rim 233 of the trimmed article A.

Each stacker chute 230 includes a plurality of article holding and stacking brushes 238 which are mounted on the insides of the elongate stacker rods 228 circumferentially spaced about the axis 229 to hold the peripheral edges 235 of the rim 233. The distances between the opposing inner ends 238A of brushes 238 is slightly less than the article diameter 232 so that the rims 233 of the articles A are snugly received thereby but, as the brushes 238 yield, allow the articles A to be moved downstream in the stack as each successive part A is discharged.

As the mold and trim die 48 reaches a position in which the mold cavities 62 commence nesting with the endmost articles A in the stacks 236 in the position illustrated in chain lines in FIG. 2B, the cooperating rack 212 and pinion gear 216 are actuated via motor 240 to urge the ejector bar 210 horizontally outwardly relative to the mold 60 to the full eject position illustrated in FIG. 10. The relative movement of the ejector bar 210 and mold 60 occurs as the mold 60 is being horizontally advanced from the position illustrated in FIG. 9A to the discharge position illustrated in FIG. 10A and without having to wait for the mold 60 to reach its final discharge position before ejecting and without having to stop while the article A is being ejected.

As the lower mold and trim die 48 reaches the discharge position illustrated in FIG. 10A, the article A will be nested with the endmost articles A' in the stack 236 of previously discharged articles A. The ejector 200 will push the entire stack 236 downstream a distance 237 so that the article A is slidingly received by the stacker rods 228 and stacking brushes 238.

Temperature Control and Horizontal Stabilizing Apparatus

Temperature control and horizontal stabilizing apparatus, generally designated 240, is provided for controlling the temperature of and laterally stabilizing the lower mold and trim die 48 and includes a pair of vertically spaced, horizontally disposed rails 242 fixed to the laterally outer sides of the laterally spaced apart vertical cam plate 118 illustrated at the left side of FIG. 1. The apparatus 240 includes a pair of vertically spaced linear bearings 244 having transverse horizontal slots 246 therein slidably receiving the rails 242 and having vertical slots for vertically sliding and guiding vertical guide 250. The linear bearings 244 allow limited vertical and horizontal movement of the lower platen 50, relative to the frame 20, as the cam follower rollers 130, 180 and 182 travel along cam tracks 176, 186 and 196, respectively, and yet restrain the lateral movement of the platen 50.

A water supply hose 252 passes through a multi-lobe opening 254 in one of the adjacent cam plates 118 and is coupled at its laterally inner end 256 to the platen 50 for supplying temperature control liquid, such as water, to the lower mold 60. A discharge supply hose 258 is threadedly coupled at 268 to the platen for removing the temperature control water from the mold 60 and passes through a similar multi-lobe opening 254 cut in the opposite cam plate 118.

The center line 264 of the water supply and discharge hoses 252 and 258 travels linearly along the vertical path 168 and then horizontally along the horizontal path 170, however, at the apex or juncture 204 of the linear paths 168 and 170, before proceeding linearly along horizontal linear path 170, the centerline 264 travels in an oval shaped path represented by the reference character 266 (FIG. 11).

The center of mass C and the rotational axis a of the lower mold and trim die 48, intersecting the center of mass C of the mold and trim die 48, will follow the linear paths 168 and 170. As the mold trim die 48 and cam follower rollers 130, 180 and 182 move from the positions illustrated in FIG. 6A to the lowermost position illustrated in FIG. 8A, the lower mold and trim die 48, the center of mass C and the rotational axis a will vertically linearly move downwardly and accelerate along the upper or first portion 202 of the vertical linear path 101. There is a transition zone, represented by the reference character 268 (FIG. 9), at the junction of cam track sections 176A and 176B, at which the follower rollers 130, 180 and 182 cease moving vertically only to moving vertically and horizontally along the curvilinear, intermediate cam track sections 176B, 186B and 196B.

The cam follower rollers 130, 180 and 182 travel along the first half of intermediate track portions 176B, 186B and 196B to the positions illustrated in FIG. 8 as the lower mold and trim die 48 the center of mass C and the rotational axis a are moved linearly downwardly through the lower two-thirds stroke 205 of the vertical path 168 to its lowermost position illustrated in FIG. 8A. During the movement of follower rollers 130, 180 and 182 through the upper half of tracks 176, 186 and 196, the articles A will be rotated about the axis a intersecting the center of mass C reoriented through an angle 207 of approximately 40 degrees. During the movement of the follower rollers 130, 180 and 182 through the first or upper half of the tracks 176, 186 and 196, respectively, the lower trim die 48 and the center of mass C will have been moved through two-thirds of the vertical linear path 168, and the articles A will be reoriented through an angle 209 of 40 degrees approximately one-half of the total reorientation angle 172 of 80 degrees.

After the center of mass C and rotational axis a reaches the apex 204, the cam follower rollers 130, 180 and 182 will have negotiated one-half of the track sections 176, 186 and 196, respectively, and will be in the positions illustrated in FIG. 8A.

As the trim die assembly 34 moves from the position illustrated in FIG. 8 and 8A to the position illustrated in FIG. 9 and 9A, the lower mold and trim die 48 will commence moving linearly along the horizontal linear path 170 and continues to rotate about the axis a intersecting the center of mass C through a 40 degree angle 172 which is one-half the total rotational angle 207 until the lower mold and trim die 48 has reoriented to the position illustrated in FIG. 9A. In the position illustrated in FIG. 9, the cam follower rollers 130, 180 and 182 and the center of mass C will have traveled through a horizontal distance 211 which is two-thirds of the total horizontal stroke 170.

During travel along the remaining ⅓ portion 215 of the total stroke 170 by the cam follower rollers 130, 180 and 182, in the individual track 176C, 186C and 196C, respectively, the orientation of the mold and trim die 48, and the articles A supported therein, will not change from the orientation illustrated in FIG. 9A. The center of mass C is moved horizontally and slightly upwardly to the position designated C4. The mold and trim die assembly 48 is concurrently moved horizontally and slightly upwardly during the remaining ⅓ stroke 215 between the position illustrated in FIGS. 9 and 9a and the position illustrated in FIGS. 10 and 10a.

The Operation

Figure 3:
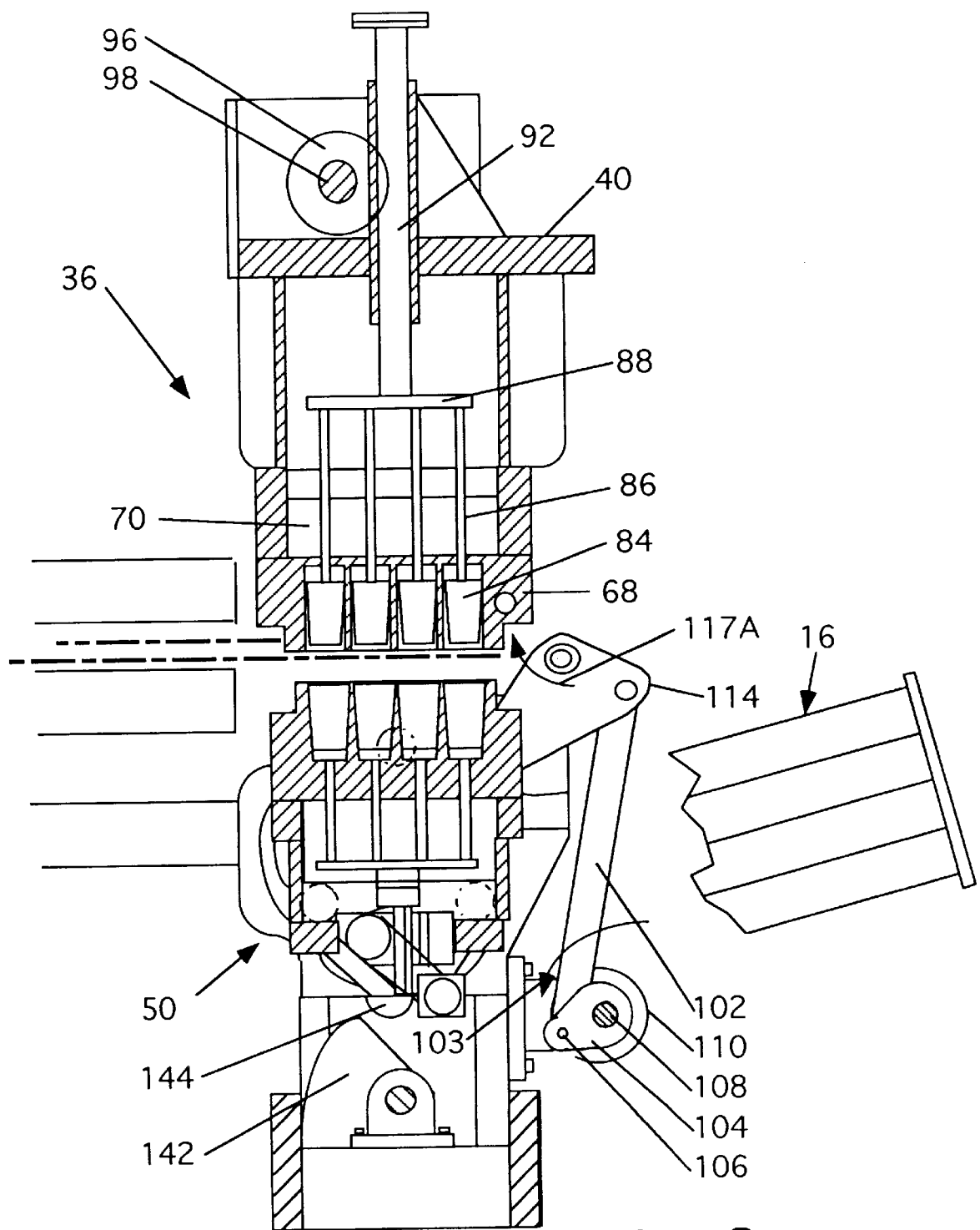
FIG. 3 is a fragmentary sectional side view, similar to FIG. 2, illustrating the mold and trim die assembly only with the molds in adjusted, spaced apart positions prior to reaching the forming positions illustrated in FIG. 2, and part of the stacker being broken away to better illustrate the mold moving mechanism therebehind.

It will be assumed that the mold and trim die assembly 34 and the various parts are initially in the positions illustrated in FIG. 3 with the upper and lower molds 74 and 60, respectively, in the spaced apart positions, the links 102 initially rotating in a direction represented by the arrow 103, and the cam 142 not yet engaging the cam follower rollers 144 coupled to the lower platen 50. The cam follower rollers 130 are at the lower ends of the linear cam track sections 176A.

The shaft 108 will continue to rotate, in the direction of the arrow 103, and the cams 142 will continue to rotate, in the direction of the arrow 117A, until the parts reach the preliminary forming positions illustrated in FIGS. 4, 4A and 4B. The upper and lower molds 74 and 60 will then engage and be sealed to the upper and lower sides 13 and 15, respectively, of the sheet 12 (FIG. 4B). At this time, the cam follower rollers 130 will be adjacent, but slightly spaced from, the upper ends of linear cam track sections 176A.

Just prior to the leading edges 155 of leading cam portions 150 of cams 142 engaging the cam follower rollers 144, the control system 163 will discontinue power to motor 109 for driving the drive shaft 108 and the links 102 and the rocker plates 114 cease to swing.

The cam follower rollers 144 will initially be traversed by the underlying beveled lead cam surfaces 154 to smoothly introduce the follower rollers 144 to the main cam surfaces 153 and then the follower rollers 144 will travel along the main cam surfaces 153, having a uniform radius 158, to incrementally upwardly index a portion of the sheet 12 and the lower mold and trim die assembly 48 to the final mold position illustrated in FIGS. 2, 5A and 5B. During the forming process which occurs in the positions illustrated in FIGS. 2, 4A and 5A, differential pressure is applied to the sheet 12 and the plugs 84 are moved downwardly to the forming position illustrated in FIG. 2, 5A and 5B in the conventional fashion. At this time, the bottom walls 65 of the lower mold 60, which later function as ejectors, are in the lowermost positions forming the bottoms of the lower mold cavities 62. Also at this time, the cam follower rollers 130, 180, and 182 are a few thousandths of an inch away from the uppermost ends of track sections 176A, 186A and 196A, respectively. The upper and lower cooperating knife edges 80 and 63A, respectively, have moved together a few thousandths of an inch, approximating one-half of the sheet thickness to partially sever the borders b of the articles A from the sheet 12.

The drive motor 165 will continue to drive the fan shaped cams 142, in the direction of the arrow 117A, to the trim position illustrated in FIG. 6A at which time, the follower rollers 144 negotiate the trailing trim cam portions 156 of the cams 144 to incrementally upwardly index the lower mold and trim die 48 an additional few thousandths of an inch from the final form position, illustrated in FIG. 5A and 5B to the trim or severing positions, illustrated in FIGS. 6A and 6B, to sever the articles A along the borders b from the sheet 12. At this time, the plug assists 84 on the upper platen 66 have been removed out of the mold cavities 62 to the position illustrated in FIG. 6A. Also, at this time, the cam follower rollers 130, 180, and 182 are in the uppermost ends of the linear cam track sections 176A, 186A and 196A, respectively, as illustrated in FIG. 6. The center of mass C is in its uppermost position at this time.

As soon as the follower rollers 144 have cleared the fan shaped cams 142, the control system 163 will re-energize servomotor 109 to drive the drive shaft 108 and reversely swing the links 102, in the direction represented by the arrow 103A (FIG. 7A), and force the rocker plates 114 to swing downwardly about the pivot pins 116 in the direction of the arrow 117.

Figure 7A:
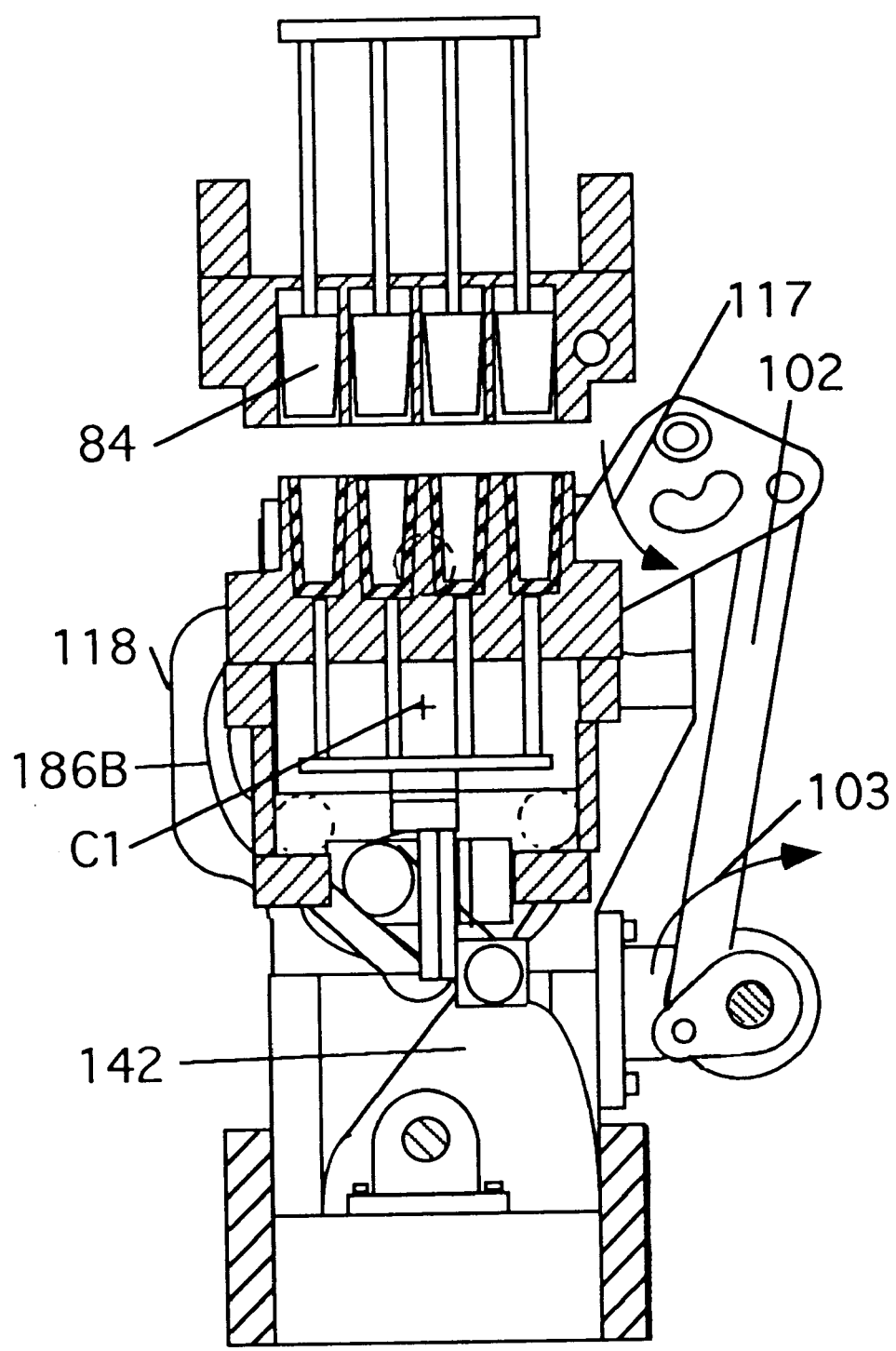
FIG. 7A is a sectional side view, similar to FIG. 6A, illustrating the lower mold and trim die in a slightly vertically lowered position when, the camming mechanism is in the position illustrated in FIG. 7.

As the lower trim die and mold 48 linearly moves from the trim position, illustrated in FIGS. 6 and 6A, to the partially lowered positions illustrated in FIGS. 7 and 7A, the center of mass C of the lower mold and trim die assembly 48 will move linearly along the vertical path 168, a distance 202, approximately one-third of the total vertical stroke 101 of the lower mold and trim die 48. During this portion of the movement, the lower mold and trim die assembly 48 moves linearly and there is no rotation of the mold and trim die assembly 48 about the axis a which intersects the center of mass in the position designated C1. During this portion of the cycle, the follower rollers 130, 180 and 182 travel vertically along the linear cam track sections 176A, 186A and 196A.

As the sequence continues and the parts move from the positions illustrated in FIGS. 7 and 7A to the positions illustrated in FIGS. 8 and 8A, the links 103 and rocker plates 114 will continue to be driven in the direction of the arrow 103A to downwardly swing the rocker plates 114 and downwardly move the lower mold and trim die 48 through the balance of the vertical stroke 205 to downwardly move the center of mass C to the apex 204 of the vertical path 168 and the horizontal path 170. During this movement, the follower rollers 130, 180 and 182 will negotiate the transition zone 268 from the linear cam track section 176A and 186A and 196A to the intermediate curvilinear track sections 176B, 186B and 196B, respectively.

As the lower mold and trim die 48 is downwardly moved from the position illustrated in FIG. 7A to the lowermost position illustrated in FIG. 8A, the cam follower rollers 130, 180 and 182 will negotiate the first half of the curvilinear track sections 176B, 186B and 196B, respectively, (FIG. 7) to rotate the lower mold and trim die 48 about the axis a intersecting the center of mass C, through an angle 207 of approximately 40 degrees or one-half of the total rotational angle 172 of 80 degrees. During the movement of the lower mold and trim die 48 from the position illustrated in FIG. 7A to the position illustrated in FIG. 8A, the energy which will have been stored in the lower mold and trim die 48, during its linear downwardly movement from the position illustrated in FIG. 6A to the position illustrated in FIG. 7A, will be converted to rotary motion of the lower mold and trim die and thus, will reduce the power otherwise required to rotate the mold and trim die 48.

As the links 102 continue to rotate from the positions illustrated in FIG. 8A to the positions illustrated in FIG. 9A, the lower mold and trim die 48, the center of mass C, and the rotational axis will have moved to the right, a distance 211 which represents substantially two-thirds of the overall horizontal stroke 169. The center of mass will now be in the position designated C3. During this horizontal linear movement of the mold and trim die 48, the lower mold and trim die 48 will be rotated about the axis a which continues to intersect the center of mass C through an angle 209 of substantially 40 degrees to complete the rotation and reorientation of the articles A so that the axes 227 of the articles A are in alignment with the axes 229 of the stacker chutes 230. At this stage, the follower rollers 130, 180 and 182 will have completely negotiated the last half of the curvilinear track section 176B, 186B and 196B, respectively as illustrated in FIG. 10.

As the shaft 108 continues to rotate to the position illustrated in FIG. 10A, the lower mold and trim die 48, the center of mass C and the axis a will horizontally and upwardly move the final one-third stroke 215 of the total stroke 169 linearly horizontally and upwardly toward the right along the linear path 170. During this, movement, the follower rollers 130, 180 and 182 travel in the linear track sections 176C, 186C and 196C so that no rotation of the mold and trim die 48 occurs during last one-third of the horizontal linear stroke.

As the mold and trim die 48 moves to the discharge position illustrated in FIG. 10A, the articles A supported therein will be partially nested with the end most, article A' disposed in a stack 236 of articles A supported by the stacker 16. Just as the mold cavities 62 and the articles A supported thereby start to nest with the endmost articles A' in the stack 236, in the position illustrated in chain lines in FIG. 2B, the control system 163 will cause ejector motor 224 to operate to rotate the pinion gear 216 and linearly drive the ejector rack 212 and ejector rods 208 and lower mold plates 65 from the retracted positions, illustrated in FIG. 9A to the eject position, illustrated in FIG. 10, which is approximately one-half of the length of the mold cavities 62. The timing is such that the ejectors 65 reach the ends of the ejecting strokes when the lower mold 60 reaches its discharge position and the articles are fully discharged, as illustrated in FIGS. 10A and 2B.

The ejector 200 will, upon the complete nesting of the articles A with the endmost articles A', incrementally index the entire stack 236 downstream a distance 237 equal to the clearance distance between the adjacent closed ends 223 of adjacent stacked articles A'. As the mold and trim die 48 is being advanced to the right, as illustrated in FIGS. 9A and 10A, the ejector 200 is concurrently moving to the right to fully eject the articles A from the mold cavity 62 while the mold and trim die 48 is in the process of being horizontally moved. The stroke of the ejector 200 will be such as to completely index the entire stack 239 of articles A incrementally downstream a distance 237 in the stacker chutes 230.

Figure 11A:
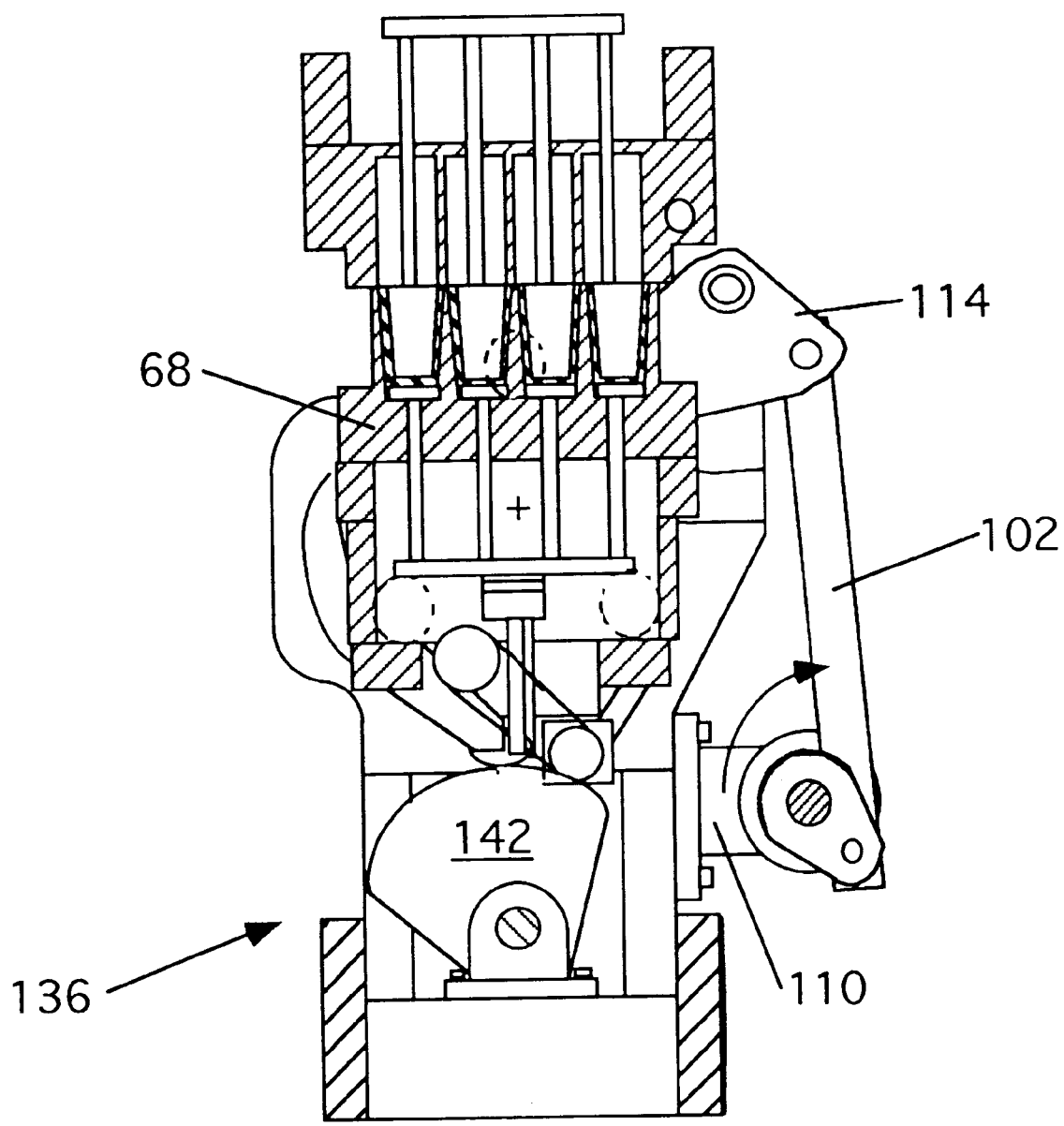
FIG. 11A is a sectional side view, similar to FIG. 10A, illustrating the position of the mold and trim die assembly returned to its starting position to repeat the cycle when the cam mechanism is in the starting position illustrated in FIG. 11.

As the shaft 108 continues to rotate from the discharge position illustrated in FIG. 10A to the forming position illustrated in FIG. 11A, the rocker plates 114 will swing upwardly in the reverse direction 117A to reversely drive the cam follower rollers 130, 180 and 182 along the cam tracks 176, 186 and 196 and the mold and trim die 48 will move in the reverse direction to the position illustrated in FIG. 11.

As the shaft 108 reversely drives the rocker plates 114, in the direction of the arrow 117A, before reaching the position illustrated in FIG. 11A, the mold and trim die assembly will pass through the same positions illustrated in FIGS. 3 and 4. When the lower mold and trim die 48 is again in the sheet advancing positions illustrated in FIG. 3, the sheet carrying chains 28 will be operated to index the sheet 12 in a downstream path. The operation can then be repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. Differential pressure forming, trimming and stacking apparatus comprising:

a frame having a forming and trimming station and a stacking station which is lower and horizontally offset relative to said forming and trimming station;

forming and trimming means on said frame for differential pressure forming an article in a thermoplastic sheet of thermoplastic material and severing said article from said sheet at said forming and trimming station;

receiver means for successively receiving said articles from said forming and trimming means to form a stack of articles at said stacking station;

said forming and trimming means including:

upper and lower molds;

mount means mounting said lower mold for vertical movement toward and away from said upper mold at said forming and trimming station between an open position, vertically spaced apart from said upper mold and a closed, sheet engaging position in which said upper and lower molds engage vertically opposite sides of said sheet;

said upper and lower molds cooperating, in said closed sheet engaging position, to form an article in said sheet at said forming and trimming station;

said mount means including means mounting said lower mold for bodily movement in a horizontal direction relative to said upper mold between said open position and a horizontally displaced, discharge position at said stacking station;

ejector means, mounted on said forming and trimming means, for ejecting an article from said lower mold, in said horizontally displaced discharge position, to said receiver means;

said mount means mounting said lower mold in a predetermined upstanding posture in said closed position; and cam means on one of said lower mold and said frame and cooperating cam follower means on the other of said lower mold and said frame for linearly moving said lower mold downwardly in a first linear path from said closed position to said open position, linearly bodily moving said lower mold from said open position to said horizontally displaced, discharge position in a second linear path, and reorienting the posture of said lower mold from said upstanding posture in said closed position to a vertically inclined posture angularly offset relative to said upstanding posture when said lower mold is in said open position; and further reorienting the posture of said lower mold from said vertically inclined posture in said open position to a horizontal disposed posture in said discharge position.

2. The apparatus set forth in claim 1 wherein said ejector means includes means for ejecting said article from said lower mold while said lower mold is moving linearly in a horizontal direction relative to said receiver means.

3. The apparatus set forth in claim 1 wherein said cam follower means comprises a plurality of cam follower members and said cam means comprises a plurality of cam members for guiding said plurality of cam follower members to follow a plurality of different paths of travel.

4. The apparatus set forth in claim 1 wherein said cam follower means comprises first, second and third cam follower members and said cam means includes first, second and third cam members for guiding said first, second and third cam follower members to travel in first, second and third independent paths of travel.

5. The apparatus set forth in claim 1 including means on said frame for moving said cam follower means relative to said cam means including a rocker plate swingably mounted on said frame for swinging movement in a to-and-fro swinging path of travel;

means drivingly coupling said rocker plate to said cam follower means; and means coupled to said rocker plate for reciprocally moving said rocker plate in said to-and-fro swinging path of travel.

6. The apparatus set forth in claim 5 including means for moving said ejector means relative to said lower mold while said lower mold is linearly moving in a horizontal direction between said open position and said horizontally displaced discharge position.

7. The apparatus set forth in claim 1 wherein said cam means and said cam follower means include means for rotating said lower mold about an axis intersecting the center of mass of said lower mold as said lower mold is moved between said closed position and said discharge position.

8. Differential pressure forming apparatus comprising:

a frame;

upper and lower, vertically opposed mold and severing means on said frame for integrally differentially pressure forming an article in a sheet of thermoplastic material and trimming the formed article from said sheet at a forming and trimming station;

means mounting one of said upper and lower mold and severing means for vertical movement toward and away from the other of the upper and lower mold and severing means between an open position, spaced apart from said other mold and severing means and a closed position in which said upper and lower mold and severing means engage vertically opposite sides of said sheet and differentially pressure form said article in said one upper and lower mold and severing means;

means for horizontally bodily displacing said one mold and severing means relative to said other of the upper and lower mold and severing means from said open position to a horizontally displaced, discharge position; and means for discharging said article from said one mold and severing means in said discharge position;

said means for horizontally bodily displacing including cam means on one of said frame and said one mold and severing means and cam follower means on said other of said frame and said one mold and severing means for vertically linearly guiding said one mold and severing means, in a vertical path of travel between said closed position and said open position, horizontally, linearly bodily moving said one mold and severing means in a second linear path of travel transverse to said vertical path of travel, between said open position and said discharge position; and partially rotating said one mold and severing means between a predetermined upstanding posture in said open position and a horizontally disposed posture in said discharge position.

9. The differential pressure forming apparatus set forth in claim 8 including receiving and stacking means for successively receiving successive ones of said articles successively formed in said one mold and severing means from said one mold and severing means in said discharge position and stacking said articles in nested relation.

10. The differential pressure forming machine set forth in claim 8 wherein said cam means includes first, second and third cam follower members mounted on one of said frame and said one mold and severing means; said cam follower means comprises first, second and third cam follower members mounted on the other of said frame and said one mold and severing means for guiding said first, second and third cam follower members, in first, second and third paths of travel, respectively.

11. The differential pressure forming machine set forth in claim 8 including means for vertically moving said one mold and severing means between said closed and open positions comprising a rocker plate swingably mounted on said frame for swinging movement in a first to-and-fro swinging path of travel; means for swinging said rocker plate in said to-and-fro path including a reciprocable arm coupled to said rocker plate; means for driving said reciprocable arm in a second to-and-fro path of travel to move said rocker plate in said first to-and-fro path of travel.

12. The apparatus set forth in claim 8 wherein said means for discharging said article from said one mold and severing means in said discharge position includes means for moving said article formed in said one mold and severing means relative to said one mold and severing means as said one mold and severing means is moving in a horizontal direction between said open position and said discharge position.

13. The apparatus set forth in claim 8 including receiving and stacking means at said discharge station for successively receiving articles discharged from said one mold and severing means in said discharge position; said one mold and severing means being disposed in nesting relation with a previously discharged article at said discharge station before said means for discharging discharges said article from said one mold and severing means.

14. The apparatus set forth in claim 13 including means for retracting said one mold and severing means from said discharge position to said open position and thence to said closed position including means for partially rotating said one mold and severing means from a horizontal disposed posture at said discharge position to a vertically disposed posture at said closed position.

15. The differential pressure forming apparatus set forth in claim 8 including reorienting means for reorienting said one mold and severing means between a first predetermined orientation in said closed position and a second, predetermined orientation, angularly offset relative to said first orientation when said one mold and severing means is in said open position.

16. The differential pressure forming apparatus set forth in claim 15 wherein said reorienting means includes means for reorienting said one mold and severing means to a third predetermined orientation, angularly offset relative to said first and second predetermined orientations, when said one mold and severing means moves from said open position to said discharge position.

17. In apparatus for differential pressure forming articles in a thermoplastic sheet, severing the articles from the sheet, and stacking the articles in a stacking receiver including:

a frame;

means on said frame for transporting said thermoplastic sheet in a downstream path of travel to a forming and trimming station;

means on said frame for differential pressure forming an article in said sheet and severing the formed article in place from said sheet at said forming and trimming station including first and second mold means, mounted on said frame for differential pressure forming an article in said sheet at said forming and trimming station;

means mounting said first mold means on said frame for movement relative to said second mold means in a first linear path between an open removed position, spaced apart from said second mold means and said sheet, and a closed position in which said first and second mold means engage opposite sides of said sheet to form an article therein, said first mold means in said closed position having a first predetermined orientation;

wherein said apparatus comprises:

a stacking receiver at a discharge station downstream of said forming and trimming station for receiving articles from said first mold means;

mount means mounting said first mold means for transverse movement in a downstream path of travel relative to said second mold means in a second linear path, transverse to said first linear path, between said open position, in which said first mold means is spaced upstream from said stacking receiver, and another previously formed article on said stacking receiver, and a transversely displaced, partially nested downstream discharge position in which an article carried by said first mold means is in a partially nested position received by and partially nested with said another, previously formed article on said stacking receiver;

reorienting means mounting said first mold means for partial reorientation relative to said mount means as said first mold means moves from said closed position to said discharge position to reorient said first mold means to a second orientation transversely inclined to said first predetermined orientation; and means for discharging an article in said first mold means, in said second orientation, from said partially nested position in said first mold means in said transversely displaced, discharge position to a fully discharged position received by said stacking receiver for nesting with said another previously formed article in said second orientation on said receiver to form a stack.

18. The apparatus set forth in claim 17 wherein said reorienting means includes cam means on one of said frame and said first mold means and cooperating cam follower means on the other of said frame and said first mold means for rotating said first mold means, as said first mold means moves in said first linear path from said closed position to said open position, to reorient said fist mold means from said first orientation to a third orientation intermediate said first and second orientations, and further rotating said first mold means from said third orientation to said second orientation as said mold means is transversely displaced from said open position to said discharge position.

19. The apparatus set forth in claim 18 wherein said cam follower means comprises first, second and third cam followers, said cam means comprising first, second and third cam sections for guiding said first, second and third cam followers in first, second and third paths of travel.

20. The apparatus set forth in claim 19 wherein said cam means and said cam follower means include means for transversely linearly moving said first mold means in said second linear path after said first mold means is rotated to reorient said third mold means from said first orientation to said second orientation.

21. The apparatus set forth in claim 17 including means for moving said first mold means, in said second orientation, in said second linear path to and from said discharge position in which said first mold means telescopically receives a portion of said another previously formed article discharged to said stacking receiver.

22. The apparatus set forth in claim 21 wherein said means for discharging includes means for ejecting an article from said first mold means while said first mold means is moving linearly relative to said stacking receiver in said second linear path.

23. The apparatus set forth in claim 17 including means for moving said first mold means in said second linear path and in said second orientation to said discharge position in which an article carried by said first mold means is received by and nested with another similarly oriented ejected article on said stacking receiver, and means is provided for ejecting an article from said first mold means, in said second orientation, to said stacking receiver for nesting with said another previously formed article to form a stack.

24. The apparatus set forth in claim 23 wherein said means for ejecting includes means for ejecting said article from said first mold means while said first mold means is linearly moving in said second linear path relative to said stacking receiver.

25. The apparatus set forth in claim 17 wherein said reorienting means includes means for maintaining said first mold means in said predetermined orientation during a first portion of movement of said first mold means from said closed position to said open position, and, means for reorienting said first mold means to a third predetermined orientation, and intermediate said first and second predetermined orientations, as said first mold means moves through a second portion of movement of said first mold means from said closed position to said open position.

26. The apparatus set forth in claim 25 wherein said reorienting means includes means for reorienting said first mold means from said third orientation to said second predetermined orientation during movement of said first mold means from said open position to said discharge position.

27. In apparatus for differential pressure forming articles in a thermoplastic sheet and severing the articles from said sheet at a form and trim station and transferring the articles in a horizontal direction to a lower, horizontally displaced discharge station including:

a frame;

means on said frame for transporting said thermoplastic sheet in a downstream path of travel to said form and trim station;

means on said frame for differential pressure forming an article in said sheet and severing the formed article from said sheet at said form and trim station including upper and lower mold and trim die means mounted on said frame for movement relative to each other;

means mounting one of said upper and lower mold and trim die means for movement, in a vertical direction, between an open position, spaced apart from said thermoplastic sheet, and a closed position in which said upper and lower mold and trim die means engage opposite sides of said sheet and form an article in said sheet;

said one mold and trim die means having a first predetermined orientation in said closed position and including a predetermined mass having a center of mass;

wherein said apparatus includes:

displacing means for moving said one mold and trim die means between said open and closed positions and for transferring an article formed in said one mold and trim die means from said form and trim station to said discharge station including:

means for moving said one mold and trim die means in a vertical direction, to move said center of mass in a first linear path, between said closed position and said open position;

reorienting means for rotating said one mold and trim die means about a one axis, intersecting said center of mass, to reorient said one mold and trim die means from said first predetermined orientation to a second orientation, displaced from the vertical, as said center of mass is moving in said first linear path; and means for transversely moving said one mold and trim die means to move said center of mass in a second linear path, transverse to said first linear path, and transfer said one mold and trim die means, and an article formed therein, to said discharge station; and means for discharging said article in said one mold and trim die means from said mold means at said discharge station.

28. The apparatus as set forth in claim 27 wherein said one mold and trim die means stores linear motion energy as it moves from said closed position to said open position; said displacing means including means for converting said linear motion energy to rotary motion energy to rotate said first mold and trim die means about said centerline to store rotary motion energy in said one mold and trim die means.

29. The apparatus set forth in claim 28 wherein said displacing means includes means for converting said rotary motion energy to additional linear motion energy to horizontally displace said one mold and trim die means from said open position to said discharge position.

30. The apparatus set forth in claim 29 wherein said displacing means includes cam means on one of said frame and said one mold and trim die means and cam follower means on the other of said frame and said one mold and trim die means.

31. The apparatus set forth in claim 30 wherein said cam follower means comprises first, second and third cam follower members, said cam means comprises first, second and third cam sections for moving said first, second and third cam follower members in first, second and third paths of travel, respectively, to rotate said one mold and trim die means about a second axis removed from said first axis.

32. The apparatus set forth in claim 27 wherein said reorienting means includes means for further rotating said one mold and trim die means about said axis, intersecting said center of mass from said second orientation to a third orientation, further displaced from the vertical as said one mold and trim die means is transversely moved and said center of mass is moved in said second linear path.

33. In apparatus for differential pressure forming articles in a thermoplastic sheet and severing the articles from said sheet at a form and trim station and horizontally transferring the articles to a horizontally displaced discharge station including:

a frame;

means on said frame for transporting said thermoplastic sheet in a downstream path of travel to said form and trim station;

means on said frame for differential pressure forming an article in said sheet and severing the formed article from said sheet at said form and trim station including:

upper and lower mold and trim die means mounted on said frame for movement relative to each other;

means mounting one of said upper and lower mold and trim means for vertical movement between an open position, spaced apart from said thermoplastic sheet, and a closed position in which said upper and lower mold and trim die means engage opposite sides of said sheet and form an article in said sheet;

said one mold and trim die means including a predetermined mass having a center of mass;

wherein said apparatus includes:

means for moving said one mold and trim die means in a vertical direction, to move said center of mass in a first, generally linear path of travel, from said closed position to said open position and store linear energy in said one mold and trim die means;

means for converting said stored linear energy to rotary energy and utilizing the rotary energy to rotate said one mold and trim die means about an axis, intersecting said center of mass, to a horizontally disposed orientation as said center of mass is moved in said first linear path of travel; and means for reconverting said rotary energy to transversely disposed linear energy to transversely bodily displace said one mold and trim die means and move said center of mass in a second linear path of travel transverse to said first linear path of travel and transfer said one mold and trim die means, and an article formed therein, to said discharge station.

34. Differential pressure forming apparatus comprising:

a frame;

means on said frame for moving a longitudinally extending thermoplastic sheet in a downstream path of travel to a form and trim station;

mold and trim means having a first predetermined orientation for differential pressure forming an article in said thermoplastic sheet and severing the article thus formed from said sheet in place at said form and trim station; and displacing means for moving said mold and trim means from said form and trim station to a discharge station downstream of said form and trim station comprising:

cam means on one of said frame and said mold and trim means, and cooperating cam follower means on the other of said frame and said mold and trim means for
guiding said mold and trim means in a first linear path of travel,
rotating said one mold and trim means to reorient said mold and trim means to a second orientation angularly offset relative to said first predetermined orientation, and
transversely displacing said mold and trim means, in said second orientation, in a second linear path of travel transverse to said first path of travel downstream toward said discharge station;

said displacing means including means for converting linear energy stored in said mold and trim means moving in said first linear path of travel to rotary energy to rotate said mold and trim means.

35. The apparatus set forth in claim 34 wherein said displacing means includes means for converting rotary energy of said rotating mold and trim means to linear energy for transversely moving said mold and trim means in said second linear path of travel.

36. The differential pressure forming machine set forth in claim 34 wherein one of said cam means and said cam follower means includes means for partially rotating said mold and trim means to reorient said mold and trim means to a third orientation, intermediate said first and second orientation, as said mold and trim means is moved in said first linear path of travel.

37. The differential pressure forming machine set forth in claim 36 wherein one of said cam means and said cam follower means includes means for rotating said first mold means about said axis to rotate said mold means from said third orientation to said second orientation as said first mold means moves in said second linear path of travel.

38. Transfer apparatus for transferring a differential pressure forming mold and trim die between a raised, mold and trim position, with a first predetermined upstanding orientation, engaging a longitudinally extending thermoplastic sheet at a mold and trim station at which an article is integrally differentially pressure formed in, and trimmed from, said thermoplastic sheet by said mold and trim die, and a lowered, horizontally displaced discharge station, said transfer apparatus comprising:

a frame;
transfer means on said frame for vertically downwardly moving said mold and trim die in a first linear path from said raised, mold and trim position to a vertically removed position, removed from said sheet,
means for transversely moving said mold and trim die in a second linear path, transverse to said first path, from said vertically removed position to a horizontally removed discharge position at said discharge station;
means for reorienting said mold and trim die from said first predetermined upstanding orientation at said mold and trim station to a horizontally offset orientation at said discharge station;
ejector means mounted on said mold and trim die for ejecting an article, formed in and trimmed by said mold and trim die, from said mold and trim die, in said horizontally offset orientation, at said horizontally displaced discharge station;
means at said discharge station for successively receiving and stacking articles from said mold and trim die to form a stack of articles; and
means for operating said ejector means to eject an article from said form and trim die as said form and trim die is being moved from said vertically removed position to said discharge station.

39. The apparatus set forth in claim 38 wherein said mold and trim die has a predetermined mass including a center of mass which is moved in said first and second linear paths as said mold and trim means is moved in said first and second paths, respectively; said means for reorienting said mold and trim die including means for rotating said mold and trim die about an axis intersecting said center of mass of said mold and trim die.

40. The apparatus set forth in claim 39 wherein said transfer means includes cam means on one of said frame and said mold and trim die and cam follower means on the other of said frame and said mold and trim die.

41. The apparatus set forth in claim 40 wherein said cam follower means comprises a plurality of cam follower members, said cam means comprises a plurality of independent cam sections for receiving and guiding said cam follower members in a plurality of independent paths of travel.

42. The apparatus set forth in claim 41 wherein said cam means comprises a pair of laterally spaced apart upstanding cam plates mounted on said frame, each of said plates including first, second and third independent cam surfaces defining said cam sections, said plurality of cam follower members comprising first, second and third cam followers received in said first, second and third independent cam surfaces for guiding in first, second and third independent paths of travel.

43. The apparatus set forth in claim 42 wherein said transfer means includes rocker plate means mounted on said frame for to-and-fro rocking movement, means for rocking said rocker plate means in a to-and-fro rocking path of travel, and means coupling said rocker plate means to one of said cam followers for moving said cam followers on said cam surfaces.

44. The apparatus set forth in claim 43 wherein said means for rocking said rocker plate means comprises a reciprocal arm mounted on said frame for reciprocal movement in a reciprocal swinging path of travel; and servomotor means for driving said reciprocal arm in said reciprocal swinging path of travel.

45. The apparatus set forth in claim 38 wherein said means for transversely moving said mold and trim die includes means for moving said mold and trim die horizontally to move an article carried by said mold and trim die into telescoping relation with a previously discharged article on said receiving and stacking means at said discharge station, and said means for ejecting an article includes means operative to eject said article while said article carried by said mold and trim die is in said telescoping relation.

46. The apparatus set forth in claim 38 wherein said mold and trim die includes a predetermined mass having a center of mass; said transfer means includes means for vertically moving said center of mass of said mold and trim die in a vertical path of travel and then in a transverse path of travel, which is transverse to said vertical path of travel; said means for reorienting including means for rotating said mold and trim die about an axis, intersecting said center of mass as said center of mass is moving vertically.

47. The apparatus set forth in claim 46 wherein said reorienting means includes means for rotating said mold and trim die about said axis, intersecting said center of mass, to a third orientation as said mold and trim die is horizontally displaced.

48. In combination with a frame, differential pressure mold and trim die means on said frame for differentially pressure forming an article, having a first predetermined orientation, in a thermoplastic sheet and trimming the article from the sheet in place at a mold and trim station;

said mold and trim die means being mounted on said frame for rotation about a rotational axis;
means for moving said mold and trim die means in a direction away from said thermoplastic sheet to a remote position removed from said sheet to move said rotational axis in a first linear path of travel;
means for transversely displacing said mold and trim die means from said remote position to a transversely disposed discharge position to move said rotational axis in a second linear path of travel transverse to said first linear path of travel;
reorienting means for rotating said mold and trim die means about said rotational axis to reorient said article from said first predetermined orientation at said mold and trim station to a second orientation, transversely offset relative to said predetermined orientation at said transversely disposed discharge position;
ejector means on said mold and trim die means for ejecting an article in said second orientation from said mold and trim die means in said transversely disposed discharge position; and means mounting said ejector means on said mold and trim die means for movement relative to said mold and trim die means between a recessed position and an ejecting position as said mold and trim die means moves in said second linear path of travel.

49. The combination set forth in claim 48 wherein said reorienting means includes means for partially rotating said mold and trim die means about said rotational axis to reorient said article to a third orientation, transversely disposed intermediate said first predetermined orientation and said second orientation, as said mold and trim die means is being moved away from said sheet and said rotational axis is being moved in said first path of travel.

50. The combination set forth in claim 49 wherein said reorienting means includes means for partially rotating said mold and trim die means to reorient said article from said third orientation to said second orientation as said mold and trim die means is transversely moved and said rotational axis moves in said second linear path of travel.

51. The combination set forth in claim 50 wherein said mold and trim die means has a predetermined mass with a center of mass; said rotational axis intersecting said center of mass; said reorienting means comprising means for rotating said mold and trim die means about said axis intersecting the center of mass of said mold and trim die means.

52. The combination set forth in claim 48 including stacking means telescopically receiving a portion of said mold and trim die means in said discharge position stacking articles discharged by said ejector means in nested relation to form a stack of articles at a stacking station downstream said mold and trim station.

53. The combination set forth in claim 48 including stacking means for successively receiving articles discharged from said mold and trim die means and stacking them in nested stacked relation in a stack at a stacking station downstream of said mold and trim station; said mold and trim die means and said article carried thereby in said discharge position being partially telescopically received by a previously discharged article in said stack.

54. The combination set forth in claim 53 wherein said ejector means comprises an end wall disposed in said mold and trim die means movable on said mold and trim die means between a retracted position at said mold and trim station and an eject position at said discharge position; and means for moving said ejector means from said retracted position to said eject position as said mold and trim die means is moving in said second linear path.

55. The combination set forth in claim 54 wherein said reorienting means comprises cam means on one of said frame and said mold and trim die means, and cooperating cam follower means on the other of said frame and said mold and trim die means receiving said cam means.

56. The combination set forth in claim 55 wherein said cam follower means comprises a plurality of cam followers, said cam means comprises a plurality of individual, spaced apart cam sections receiving and guiding said plurality of cam followers in a plurality of paths of travel.

57. The combination set forth in claim 48 wherein a portion of said mold and trim die means, in said discharge position, is partially telescopically received by the next adjacent downstream article previously discharged from said mold and trim die means so that an article being discharged is nested with another similarly discharged article.

58. The combination set forth in claim 56 wherein said cam means comprises a cam plate and said cam sections comprise first, second and third cam tracks angularly spaced apart on said cam plate; and said cam followers comprise first, second and third cam follower members received by said first, second and third cam tracks respectively, for concurrent movement in first, second and third different paths of travel respectively.

59. Differential pressure forming, trimming and stacking apparatus comprising:
a frame having a forming and trimming station and a stacking station which is lower and horizontally offset relative to said forming and trimming station;
forming and trimming means on said frame for differential pressure forming an article in a thermoplastic sheet of thermoplastic material and severing said article from said sheet at said forming and trimming station;
receiver means for successively receiving said articles from said forming and trimming means to form a stack of articles at said stacking station;
said forming and trimming means including
upper and lower molds;
mount means mounting said lower mold for vertical movement toward and away from said upper mold at said forming and trimming station between an open position, vertically spaced apart from said upper mold and a closed, sheet engaging position in which said upper and lower molds engage vertically opposite sides of said sheet;
said upper and lower molds cooperating, in said closed sheet engaging position, to form an article in said sheet at said forming and trimming station;
said mount means including means mounting said lower mold for bodily movement in a horizontal direction relative to said upper mold between said open position and a horizontally displaced, discharge position at said stacking station;
said lower mold including a side wall portion and a bottom wall portion mounted for to-and-fro reciprocal movement relative to said side wall portion between a retracted position, adjacent one end of said side wall portion, and an eject position removed from said one end; and
ejector means, mounted on said forming and trimming means, for ejecting an article from said lower mold, in said horizontally displaced discharge position, to said receiver means including
means mounted on said lower mold for moving said bottom wall in a to-and-fro reciprocal path between said retracted position and said eject position; and
means on said lower mold for reciprocally driving said bottom wall in a to-and-fro reciprocal path of travel while said lower mold moves in said horizontal direction between said open position and said horizontally displaced discharge position at said stacking station.

60. Differential pressure forming apparatus comprising:
a frame;
upper and lower, vertically opposed mold and severing means on said frame for integrally differentially pressure forming an article in a sheet of thermoplastic material and trimming the formed article from said sheet at a forming and trimming station;
means mounting one of said upper and lower mold and severing means for vertical movement toward and away from the other of the upper and lower mold and severing means between an open position, spaced apart from said other mold and severing means and a closed position in which said upper and lower mold and severing means engage vertically opposite sides of said sheet and differentially pressure form said article in said one mold and severing means;
means for horizontally bodily displacing said one mold and severing means relative to said other of the upper and lower mold and severing means from said open position to a horizontally displaced, discharge position; and means for discharging said article from said one mold and severing means in said discharge position including means for moving said article formed in said one mold and severing means relative to said one mold and severing means as said one mold and severing means is moving in a horizontal direction between said open position and said discharge position.

61. Differential pressure forming apparatus comprising:

a frame;

means on said frame for moving a longitudinally extending thermoplastic sheet in a downstream path of travel to a form and trim station;

mold and trim means having a first predetermined orientation for differential pressure forming an article in said thermoplastic sheet and severing the article thus formed from said sheet in place at said form and trim station; and displacing means for moving said mold and trim means from said form and trim station to a discharge station downstream of said form and trim station comprising:

cam means on one of said frame and said mold and trim means, and cooperating cam follower means on the other of said frame and said mold and trim means for guiding said mold and trim means in a first linear path of travel, rotating said one mold and trim means to reorient said mold and trim means to a second orientation angularly offset relative to said first predetermined orientation, and transversely displacing said mold and trim means, in said second orientation, in a second linear path of travel transverse to said first path of travel downstream toward said discharge station;

said cam means comprising a pair of laterally spaced apart upstanding cam plates disposed on laterally opposite sides of said thermoplastic sheet and including first, second and third cam sections; and said cam follower means comprising first, second and third cam follower members being mounted on said mold and trim means and extending laterally outwardly therefrom to be received by said first, second and third cam sections, respectively.

62. Differential pressure forming apparatus comprising:

a frame;

means on said frame for moving a longitudinally extending thermoplastic sheet in a downstream path of travel to a form and trim station;

mold and trim means having a first predetermined orientation for differential pressure forming an article in said thermoplastic sheet and severing the article thus formed from said sheet in place at said form and trim station; and displacing means for moving said mold and trim means from said form and trim station to a discharge station downstream of said form and trim station comprising:

cam means on one of said frame and said mold and trim means, and cooperating cam follower means on the other of said frame and said mold and trim means for guiding said mold and trim means in a first linear path of travel, rotating said one mold and trim means to reorient said mold and trim means to a second orientation angularly offset relative to said first predetermined orientation, and transversely displacing said mold and trim means, in said second orientation, in a second linear path of travel transverse to said first path of travel downstream toward said discharge station;

a stacking receiver at said discharge station;

said displacing means including means for moving said mold and trim means in said second linear path until said article formed in said mold and trim means is telescopically received by, and nested with, another previously discharged article on said stacking receiver at said discharge station; and ejector means on said mold and trim means for ejecting an article from said mold and trim means while said mold and trim means is moving in said second linear path.

63. Differential pressure forming apparatus comprising:

a frame;

means on said frame for moving a longitudinally extending thermoplastic sheet in a downstream path of travel to a form and trim station;

mold and trim means having a first predetermined orientation for differential pressure forming an article in said thermoplastic sheet and severing the article thus formed from said sheet in place at said form and trim station; and displacing means for moving said mold and trim means from said form and trim station to a discharge station downstream of said form and trim station comprising:

cam means on one of said frame and said mold and trim means, and cooperating cam follower means on the other of said frame and said mold and trim means for guiding said mold and trim means in a first linear path of travel, rotating said mold and trim means to reorient said mold and trim means to a second orientation angularly offset relative to said first predetermined orientation, and transversely displacing said mold and trim means, in said second orientation, in a second linear path of travel transverse to said first path of travel downstream toward said discharge station;

one of said cam means and said cam follower means including;

means for partially rotating said mold and trim means to reorient said mold and trim means to a third orientation, intermediate said first and second orientation, as said mold and trim means is moved in said first linear path of travel; and means for rotating said mold and trim means from said third orientation to said second orientation as said first mold and trim means moves in said second linear path of travel.

64. Differential pressure forming, trimming and stacking apparatus comprising:

a frame having an upstream forming and trimming station and a downstream stacking station which is lower and horizontally offset downstream relative to said forming and trimming station;

forming and trimming means on said frame for differential pressure forming an article in a thermoplastic sheet of thermoplastic material and severing said article from said sheet at said forming and trimming station;

receiver means, downstream of said forming and trimming means, for successively receiving said articles from said forming and trimming means to form a stack of articles at said stacking station;

said forming and trimming means including
upper and lower molds;
mount means including means mounting said lower mold for vertical movement toward and away from said upper mold at said forming and trimming station between a closed, sheet engaging position in which said upper and lower molds engage vertically opposite sides of said sheet and an open position, vertically spaced apart from said upper mold;
said upper and lower molds cooperating, in said closed sheet engaging position, to form an article in said sheet at said forming and trimming station;
said mount means including means, mounting said lower mold for bodily movement in a horizontally downstream and upward direction relative to said upper mold and said receiver means between said open position and a horizontally downstream and upper discharge position at said stacking station;
ejector means, mounted on said forming and trimming means, for ejecting an article from said lower mold, in said horizontally downstream and upper discharge position, to said receiver means; and
means for swingably reorienting said lower mold about an axis relative to said mount means between a first predetermined disposition when said lower mold is in said closed position and a second, angularly offset disposition when said lower mold is at said horizontally downstream and upper discharge position at said stacking station.

65. The apparatus set forth in claim 64 wherein said axis intersects the center of mass of said lower mold.

66. The apparatus set forth in claim 65, including means for reorienting said lower mold from said first disposition to a third disposition, intermediate said first and second disposition, during said bodily movement of said lower mold from said closed position to said open position.

67. Differential pressure forming apparatus comprising:
a frame;
upper and lower, vertically opposed mold and severing means on said frame for integrally differentially pressure forming an article in said sheet and trimming the formed article from said sheet at a forming and trimming station;
mount means including means mounting said lower mold and severing means for vertical movement toward and away from the upper mold and severing means between an open position, spaced apart from said upper mold and severing means and a closed position in which said upper and lower mold and severing means engage vertically opposite sides of said sheet and differentially pressure form said article in said upper and lower mold and severing means;
said mount means including means for horizontally and upwardly bodily displacing said lower mold and severing means relative to said upper mold and severing means to move said lower mold and severing means from said open position to a horizontally and upwardly displaced, discharge position;
means for discharging said article from said lower mold and severing means in said discharge position; and
reorienting means for reorienting said lower mold and severing means between a first predetermined orientation in said closed position and a second predetermined orientation, angularly offset relative to said first orientation when said lower mold and severing means is in said open position;
said reorienting means including means for reorienting said lower mold and severing means relative to said mount means to a third predetermined orientation, angularly offset relative to said first and second predetermined orientations, when said lower mold and severing means moves from said open position to said discharge position.

68. Differential pressure forming apparatus comprising:
a frame;
means on said frame for moving a longitudinally extending thermoplastic sheet in a downstream path of travel to a form and trim station;
mold and trim means having a first predetermined orientation for differential pressure forming an article in said thermoplastic sheet and severing the article thus formed from said sheet in place at said form and tim station; and
displacing means for moving said mold and trim means from said form and trim station to a discharge station downstream of said form and tim station comprising:
first means on one of said frame and said mold and trim means, and
second cooperating means on the other of said frame and said mold and trim means for
guiding said mold and trim means in a first linear path of travel,
rotating said mold and trim means to reorient said mold and trim means to a second orientation angularly offset relative to said first predetermined orientation, and
transversely displacing said mold and trim means, in said second orientation, in a second linear path of travel transverse to said first path of travel downstream toward said discharge station;
one of said first means and said second cooperating means including;
means for partially rotating said mold and trim means to reorient said mold and trim means to a third orientation, intermediate said first and second orientation, as said mold and trim means is moved in said first linear path of travel; and
means for rotating said mold and trim means from said third orientation to said second orientation as said first mold and trim means moves in said second linear path of travel.

69. Differential pressure forming, trimming and stacking apparatus comprising:
a frame having an upstream forming and trimming station and a downstream discharge station which is horizontally offset downstream relative to said forming and trimming station;
forming and trimming means on said frame for differential pressure forming an article in a thermoplastic sheet of thermoplastic material and severing said article from said sheet at said forming and trimming station;
receiver means, downstream of said forming and trimming means, for successively receiving said articles from said forming and trimming means at said downstream discharge station;
said forming and trimming means including
upper and lower molds;
mount means including means mounting said lower mold for vertical movement toward and away from said upper mold at said forming and trimming station between a closed, sheet engaging position in which said upper and lower molds engage vertically opposite sides of said sheet and an open position, vertically spaced apart from said upper mold;

said upper and lower molds cooperating, in said closed sheet engaging position, to form an article in said sheet at said forming and trimming station;

said mount means including means mounting said lower mold for bodily movement in a horizontally and upwardly downstream direction relative to said upper mold and said receiver means between said open position and a horizontally and upwardly downstream discharge position at said discharge station;

ejector means, mounted on said forming and trimming means, for ejecting an article from said lower mold, in said downstream discharge position, to said receiver means; and means for swingably reorienting said lower mold about an axis relative to said mount means between a first predetermined disposition when said lower mold is in said closed position and a second, angularly offset disposition when said lower mold is at said horizontally downstream discharge position at said discharge station.

70. Differential pressure forming apparatus comprising:

a frame;

upper and lower, vertically opposed mold and severing means on said frame for integrally differentially pressure forming an article in a sheet of thermoplastic material and trimming the formed article from said sheet at a forming and trimming station;

means mounting one of said upper and lower mold and severing means for vertical movement toward and away from the other of the upper and lower mold and severing means between an open position, spaced apart from said other mold and severing means and a closed position in which said upper and lower mold and severing means engage vertically opposite sides of said sheet and differentially pressure form said article in said one upper and lower mold and severing means;

means for horizontally bodily displacing said one mold and severing means relative to said other of the upper and lower mold and severing means from said open position to a horizontally displaced, discharge position; and means for discharging said article from said one mold and severing means in said discharge position;

said means for horizontally bodily displacing including first means on one of said frame and said one mold and severing means and second cooperating means on said other of said frame and said one mold and severing means for vertically linearly guiding said one mold and severing means, in a vertical path of travel between said closed position and said open position, horizontally, linearly bodily moving said one mold and severing means in a second linear path of travel transverse to said vertical path of travel, between said open position and said discharge position; and partially rotating said one mold and severing means between a predetermined upstanding posture in said open position and a horizontally disposed posture in said discharge position.

* * * * *